(12) United States Patent
Nitta et al.

(10) Patent No.: US 7,050,821 B2
(45) Date of Patent: May 23, 2006

(54) DIGITAL RADIO COMMUNICATIONS APPARATUS

(75) Inventors: Koji Nitta, Fukuoka (JP); Katsumi Nakagawa, Kasuga (JP); Shinji Fukuda, Fukuoka (JP); Yoshihiro Takehisa, Fukuoka (JP); Takatsugu Ito, Chikushino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 219 days.

(21) Appl. No.: 10/693,979

(22) Filed: Oct. 28, 2003

(65) Prior Publication Data

US 2004/0087323 A1    May 6, 2004

(30) Foreign Application Priority Data

Oct. 29, 2002  (JP)  .................. P. 2002-313894
Nov. 12, 2002  (JP)  .................. P. 2002-328042

(51) Int. Cl.
*H04Q 7/20* (2006.01)

(52) U.S. Cl. .................. 455/462; 455/465; 455/554.2; 379/428.02; 379/422.01

(58) Field of Classification Search ................ 455/462, 455/465, 554.2; 379/428.02, 422.01
See application file for complete search history.

(56) References Cited

U.S. PATENT DOCUMENTS

| | | | | |
|---|---|---|---|---|
| 5,123,041 A | * | 6/1992 | Brinkmoeller | 379/21 |
| 5,734,639 A | * | 3/1998 | Bustamante et al. | 370/208 |
| 5,748,621 A | | 5/1998 | Masuda et al. | |
| 5,990,069 A | * | 11/1999 | Andre et al. | 510/281 |
| 6,754,483 B1 | * | 6/2004 | Beamish et al. | 455/410 |
| 6,865,372 B1 | * | 3/2005 | Mauney et al. | 455/41.2 |
| 2001/0018350 A1 | * | 8/2001 | Hachimura et al. | 455/462 |

FOREIGN PATENT DOCUMENTS

| | | |
|---|---|---|
| EP | 0713345 A2 | 5/1996 |
| EP | 0921668 A2 | 6/1999 |
| JP | 5167523 | 7/1993 |
| JP | 8251653 | 9/1996 |
| JP | 8289361 | 11/1996 |

OTHER PUBLICATIONS

International Search Report dated Mar. 11, 2004.

* cited by examiner

*Primary Examiner*—Danh Cong
(74) *Attorney, Agent, or Firm*—Stevens, Davis, Miller & Mosher, LLP

(57) ABSTRACT

For the purpose of being capable of performing direct inter-handset communications while maintaining inter-handset communications via a base unit, smoothly making a transition from inter-handset communications via a base unit to direct inter-handset communications, and switching to inter-handset communications via a base unit without releasing the communications even in case direct inter-handset communications cannot be established, a local handset includes a direct inter-handset communications controller and a direct inter-handset communications transition controller for making control to establish direct inter-handset communications while maintaining communications with a base unit as well as transmitting control channels for direct inter-handset communications in vacant slots in the receiving time zones for communications with the base unit, while a distant handset includes a direct inter-handset communications controller and a direct inter-handset communications transition controller for scanning control channels for direct inter-handset communications in the time zones other than the slots occupied by communications with the base unit 100.

7 Claims, 23 Drawing Sheets

FIG. 12

| ATTRIBUTE INFORMATION TYPE | ATTRIBUTE INFORMATION STORED BY HANDSET 220 | ATTRIBUTE INFORMATION STORED BY HANDSET 230 |
|---|---|---|
| TRANSMISSION CAPABILITY | DATA COMMUNICATIONS ONLY | VOICE/DATA COMMUNICATIONS |
| NUMBER OF SIMULTANEOUSLY AVAILABLE SLOTS | 4 | 2 |
| DIRECT INTER-HANDSET COMMUNICATIONS | AVAILABLE | AVAILABLE |
| HIGH-LAYER CAPABILITY | CAMERA FUNCTION | MONITOR FUNCTION |

FIG. 18

| | |
|---|---|
| COMMUNICATION TYPE INFORMATION | IDENTIFY THAT INFORMATION IS COMMUNICATION TYPE INFORMATION |
| INFORMATION LENGTH | LENGTH OF COMMUNICATIONS TYPE INFORMATION |
| TRANSMISSION CAPABILITY | SPECIFY DATA/VOICE |
| NUMBER OF SIMULTANEOUSLY AVAILABLE SLOTS | SPECIFY NUMBER OF SIMULTANEOUSLY USED SLOTS |
| DIRECT INTER-HANDSET COMMUNICATIONS | SPECIFY DIRECT INTER-HANDSET COMMUNICATION/INTER-HANDSET COMMUNICATION VIA BASE UNIT |
| HIGH-LAYER CAPABILITY | SPECIFY CAMERA FUNCTION/MONITOR FUNCTION |

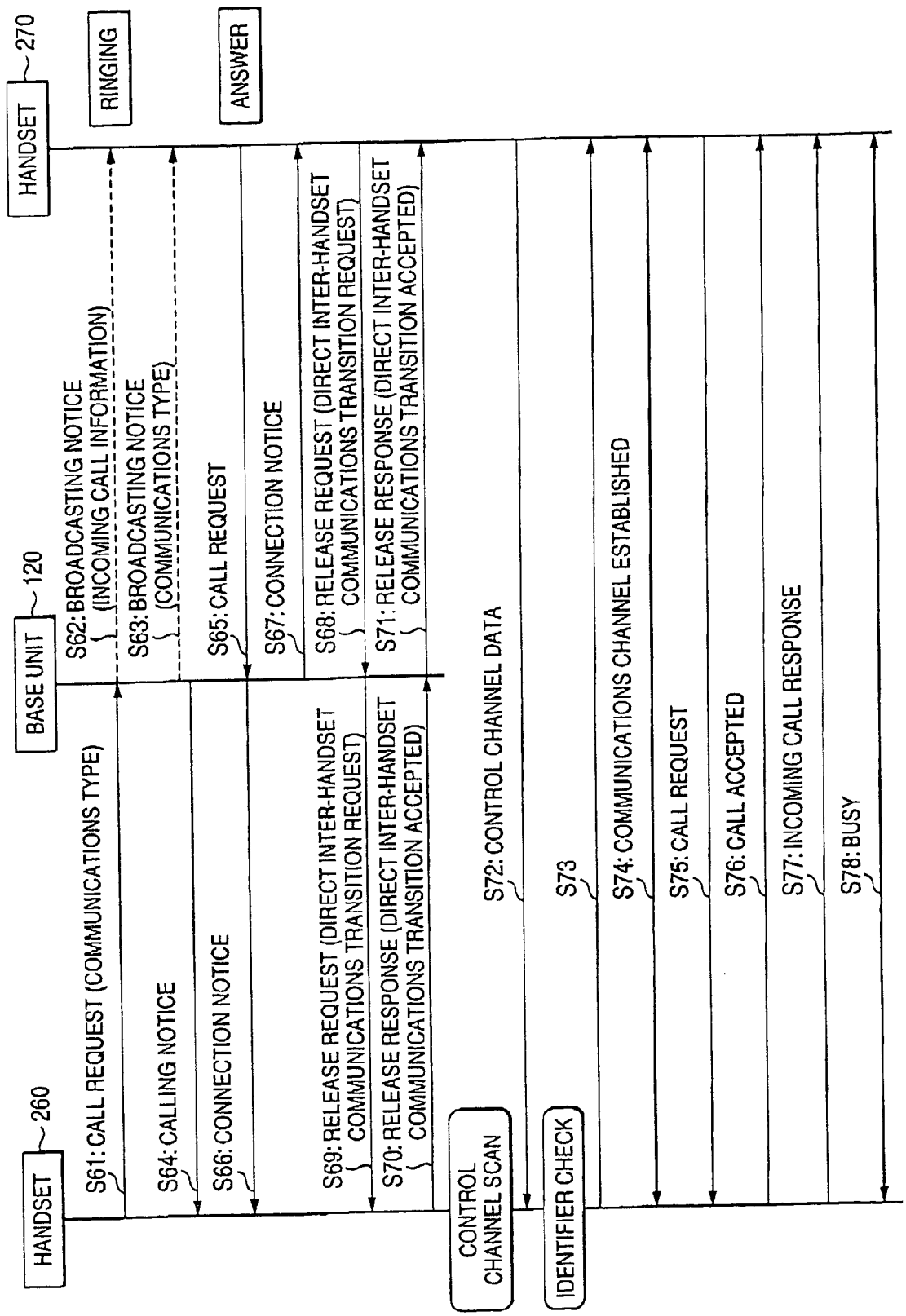

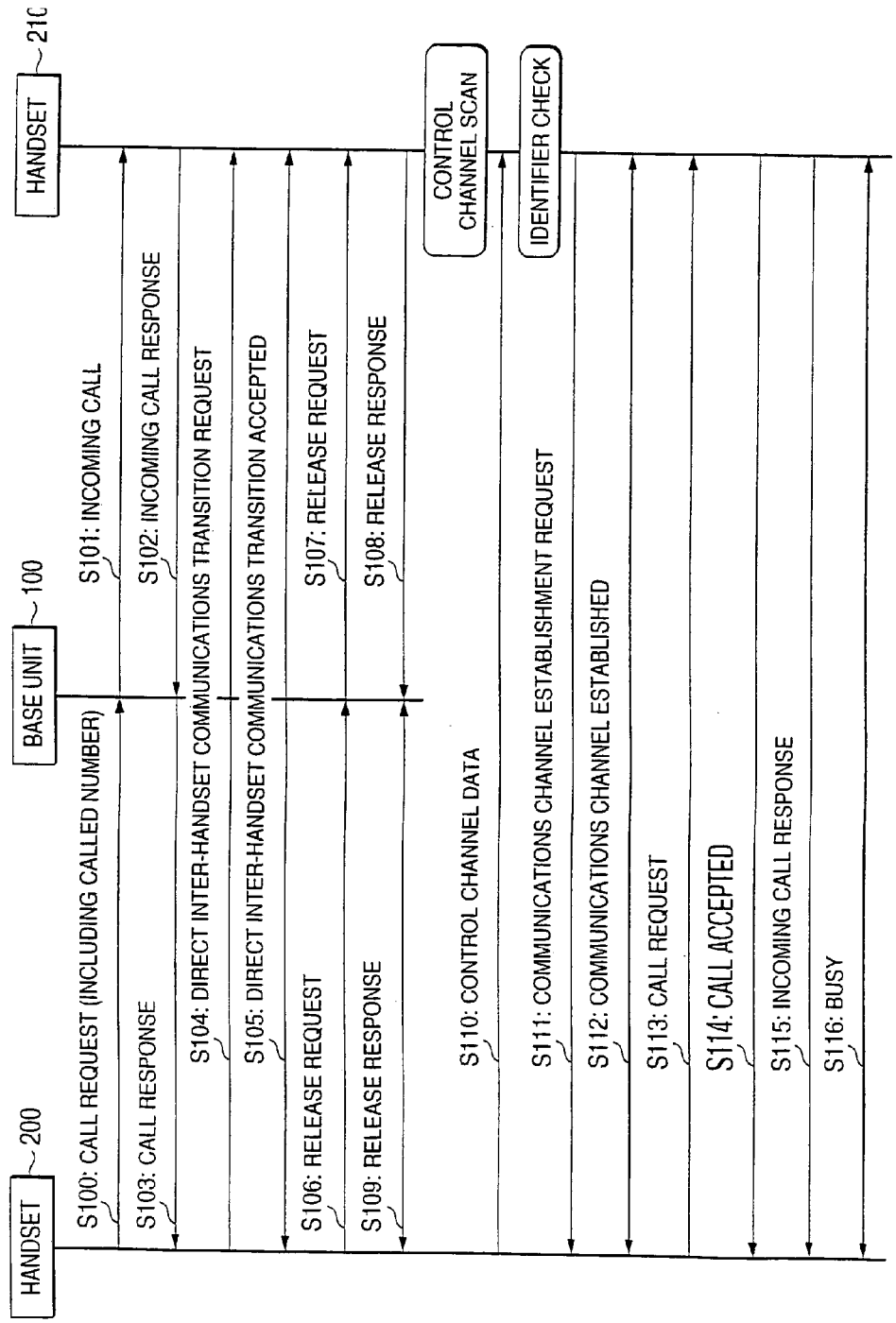

DIGITAL RADIO COMMUNICATIONS APPARATUS

BACKGROUND OF THE INVENTION

The present invention relates to digital radio communications apparatus comprising a base unit and a plurality of handsets communicable with the base unit.

FIG. 22 is a block diagram showing related art radio telephone apparatus as related art digital radio communications apparatus.

In FIG. 22, a numeral 100 designates a base unit, 101 a radio section for communicating with handsets 200, 210 mentioned later, 102 an antenna, and 103 a controller for controlling the components of the digital radio communications apparatus. The components 101 through 103 constitute the base unit 100 of the digital radio communications apparatus. A numeral 200 designates a handset, 201 a radio section for communicating with the base unit 100 or another handset 210 (mentioned later), 202 an antenna, 203 a base unit communications controller for establishing and releasing communications with the base unit 100, 204 a direct inter-handset communications controller for establishing and releasing direct inter-handset communications, and 206 a basic controller for controlling the components 201 through 204. The components 201 through 206 constitute the handset 200 of the digital radio communications apparatus. A numeral 210 designates a handset, 211 a radio section for communicating with the base unit 100 or another handset 200, 212 an antenna, 213 a base unit communications controller for establishing and releasing communications with the base unit 100, 214 a direct inter-handset communications controller for establishing and releasing direct inter-handset communications, and 216 a basic controller for controlling the components 211 through 214. The components 211 through 216 constitute the handset 210 of the digital radio communications apparatus.

A series of operations from inter-handset communications via the base unit 100 to direct inter-handset communications will be explained using FIG. 23. FIG. 23 is a sequence diagram showing an operation of the digital radio communications apparatus of FIG. 22.

In FIG. 23, in case the handset 200 starts direct inter-handset communications with the handset 210 from a state where the handsets 200 and the handsets 210 are synchronized with the base unit 100, the basic controller 206 of the handset 200 activates the base unit communications controller 203 and transmits a Call Request message to the base unit 100 (S100). The Call Request message contains information on a distant party specified by the handset 210. The controller 103 of the base unit 100, receiving the Call Request message via the antenna 102 and the radio section 101, transmits an Incoming Call message to the handset 210 specified as a called number (S101). The handset 210, receiving the Incoming Call message, transmits an Incoming Call Response message to start communications with the base unit 100 in case it can respond to the call (3102). The base unit 100 which received the Incoming Call Response message and established communications with the handset 210 transmits a Call Response message to the handset 200 (S103). The handset 200, receiving the Call Response message, activates the direct inter-handset communications 204 to transmit a Direct Inter-handset Communications Transition Request message to the handset 210 via the base unit 100 (S104). The Transition Request message contains an identifier common to the handset 200 and the handset 210 used in the direct inter-handset communications. The basic controller 216 of the handset 210, receiving the Transition Request message via the base unit 100, transmits the Transition Request message to the direct inter-handset communications controller 214. The direct inter-handset communications controller 214, receiving the Transition Request message, stores the identifier common to the handset 200 and the handset 210 contained in the Transition Request message as well as transmits a Direct Inter-handset Communications Transition Accepted message to the base unit 100 via the basic controller 216, the radio section 211 and the antenna 212 (3105). The handset 200, receiving the Transition Accepted message via the base unit 100, assumes that the transition to direct inter-handset communications is accepted and transmits a Release Request Message to the base unit 100 to release communications with the base unit 100 (S106). The base unit 100, receiving the Release Request message, transmits the Release Request message to the handset 210 (S107). The handset 210, receiving the Release Request message, transmits a Release Response message to the base unit 100 to release communications with the base unit (S108). The base unit 100, receiving the Release Response message, transmits the Release Response message to the handset 200 (S109). The basic controller 206 of the handset 210 which received the Release Response message and released communications with the base unit 100 activates the direct inter-handset communications controller 204 to start transmitting control channel data via the radio section 201 and the antenna 201 (S110). In the control channel data, the identifier common to the handset 200 and the handset 210 stored by the direct inter-handset communications storage section (not shown) and identifiers specific to both handsets, that is, a new identifier generated from the identifier of the handset 200 and an identifier of the handset 210 as a called handset, are transmitted. Meanwhile, the basic controller 216 of the handset 210, releasing communications with the base unit 100, activates the direct inter-handset communications controller 214 and uses the antenna 212 and the radio section 211 to scan the data on the control channels where identifiers including the identifier common to the handset 200 and the handset 210 are transmitted. Receiving the control channel data from the handset 200, the basic controller 216 of the handset 210, checks the identifiers including the identifier common to the handset 200 and the handset 210 as well as the identifier to identify a called handset. In case the identifier to identify the called handset is the identifier of the handset 210 as a local handset, the handset 210 transmits a communications channel establishment request to the handset 200 (S111) to establish a communications channel (S112). The handset 200, establishing the communications channel, transmits a Call Request message to the handset 210 (S113). The handset 210, receiving the Call Request message, transmits a Call Accepted message to the handset 200 (S114). In this example, a transition is made from communications via the base unit 100 to direct inter-handset communications. Thus an Incoming Call Response message is automatically transmitted from the direct inter-handset communications controller 214 to the handset 200 (S115) to start direct inter-handset communications (S116).

The digital radio communications apparatus where the above control is made is disclosed for example in the Japanese Patent Laid-Open 5-167523/(1993).

However, the related art digital radio communications apparatus (digital radio telephone apparatus) once releases inter-handset communications via abase unit before establishing direct inter-handset communications and thus has a problem of taking too much time in establishing direct inter-handset communications. In case an attempt to start direct inter-handset communications results in switching to inter-handset communications via a base unit, synchronization with the base unit must be established again. Thus, this approach takes too much time and encounters release of communications.

Further, the related art digital radio communications apparatus (digital radio telephone apparatus) cannot determine whether to make a transition to direct inter-handset communications or to maintain inter-handset communications via a base unit. In case various types of data communications using direct inter-handset communications are attempted, it cannot be determined whether the distant handset supports the type of data communications desired by the calling handset due to a variety of types of data communications.

SUMMARY OF THE INVENTION

The digital radio communications apparatus is capable of performing direct inter-handset communications while maintaining inter-handset communications via a base unit, thus smoothly making a transition from inter-handset communications via a base unit to direct inter-handset communications. It is requested to be able to switch to inter-handset communications via a base unit without releasing the ongoing communications even in case direct inter-handset communications cannot be established.

It is requested that handsets can mutually recognize a supported communication type and determine whether to make a transition to direct inter-handset communications or maintain inter-handset communications via a base unit based on the communications type provided so as to select an optimum communications type, by way of a handset-specific function, not a special function of the base unit.

In order to satisfy the requirements, the invention aims at providing digital radio communications apparatus capable of performing direct inter-handset communications while maintaining inter-handset communications via a base unit, smoothly making a transition from inter-handset communications via a base unit to direct inter-handset communications, and switching to inter-handset communications via a base unit without releasing the communications even in case direct inter-handset communications cannot be established The invention also aims at providing digital radio communications apparatus where handsets can mutually recognize a supported communication type and determine whether to make a transition to direct inter-handset communications or maintain inter-handset communications via a base unit based on the communications type provided so as to select an optimum communications type, by way of a handset-specific function, not a special function of the base unit.

In order to satisfy the requirements, digital radio communications apparatus according to the invention comprises: a base unit; a local handset communicable with the base unit; and a distant handset communicable with the base unit; characterized in that the local handset comprises: a radio section for performing radio communications; a base unit communications controller for performing radio communications with the base unit; a direct inter-handset communications controller for performing direct radio communications between handsets; and a direct inter-handset communications transition controller for making control to establish direct inter-handset communications while maintaining communications with the base unit as well as transmitting control channels for direct inter-handset communications in vacant slots in the receiving time zones for communications with the base unit; and a basic controller for controlling the components of the local handset; and that the distant handset comprises: a radio section for performing radio communications; a base unit communications controller for performing radio communications with the base unit; a direct inter-handset communications controller for performing direct radio communications between handsets; a direct inter-handset communications transition controller for making control to establish direct inter-handset communications while maintaining communications with the base unit as well as scanning control channels for direct inter-handset communications in the time zones other than the slots occupied by communications with the base unit; and a basic controller for controlling the components of the distant handset.

BRIEF DESCRIPTION OF THE DRAWINGS

FIG. 12 is a data diagram showing attribute information;

FIG. 18 is a data diagram showing communications type information;

FIG. 19 is a sequence diagram showing an operation of the digital radio communications apparatus of FIG. 16;

FIG. 23 is a sequence diagram showing an operation of the digital radio communications apparatus of FIG. 22.

DETAILED DESCRIPTION OF THE PREFERRED EMBODIMENTS

Embodiments of the invention are described below referring to FIGS. 1 through 21.

Embodiment 1

Figure 1:
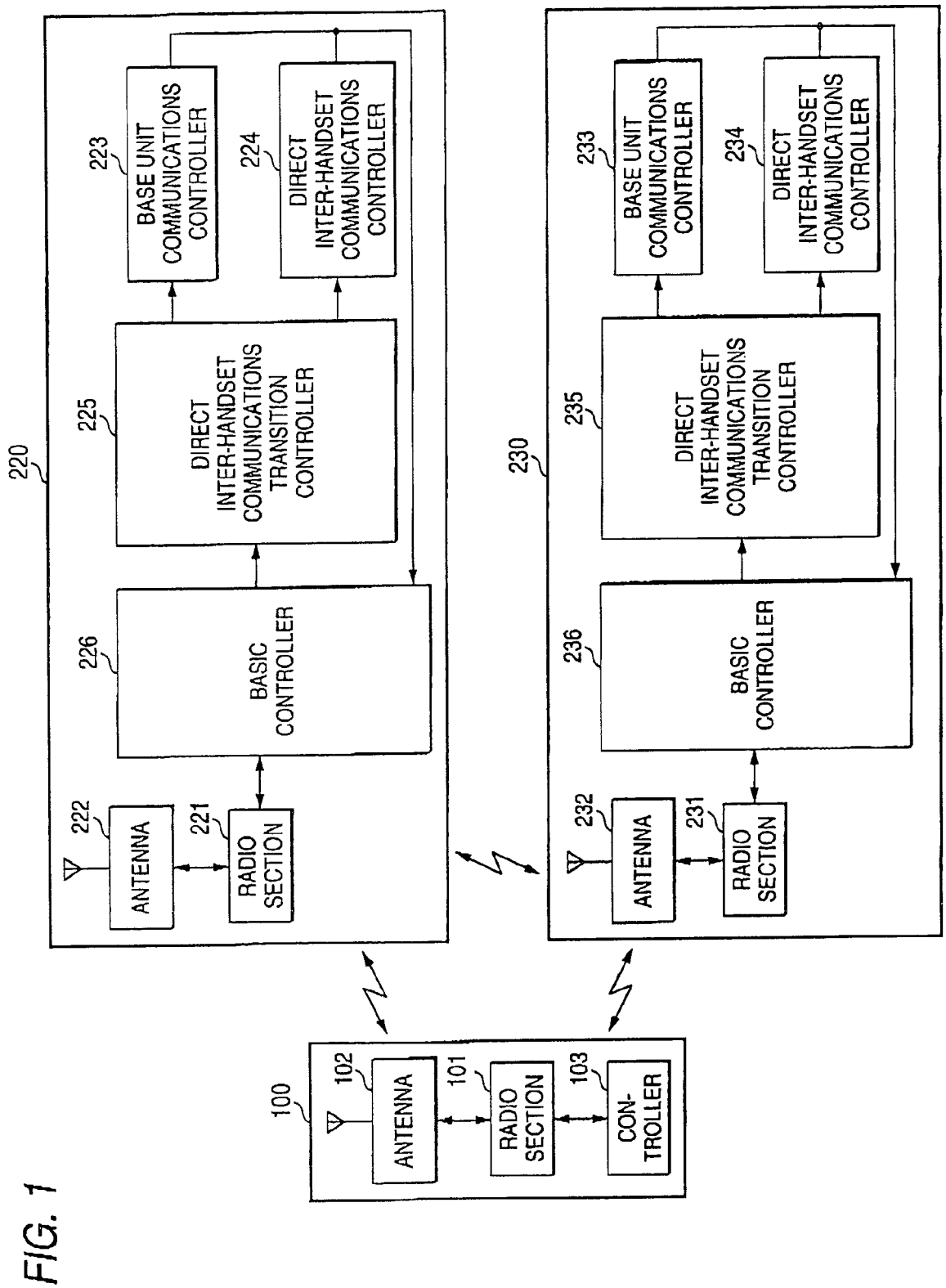
FIG. 1 is a block diagram showing digital radio communications apparatus according to Embodiment 1 of the invention.

FIG. 1 is a block diagram showing digital radio communications apparatus according to Embodiment 1 of the invention.

Figure 11:
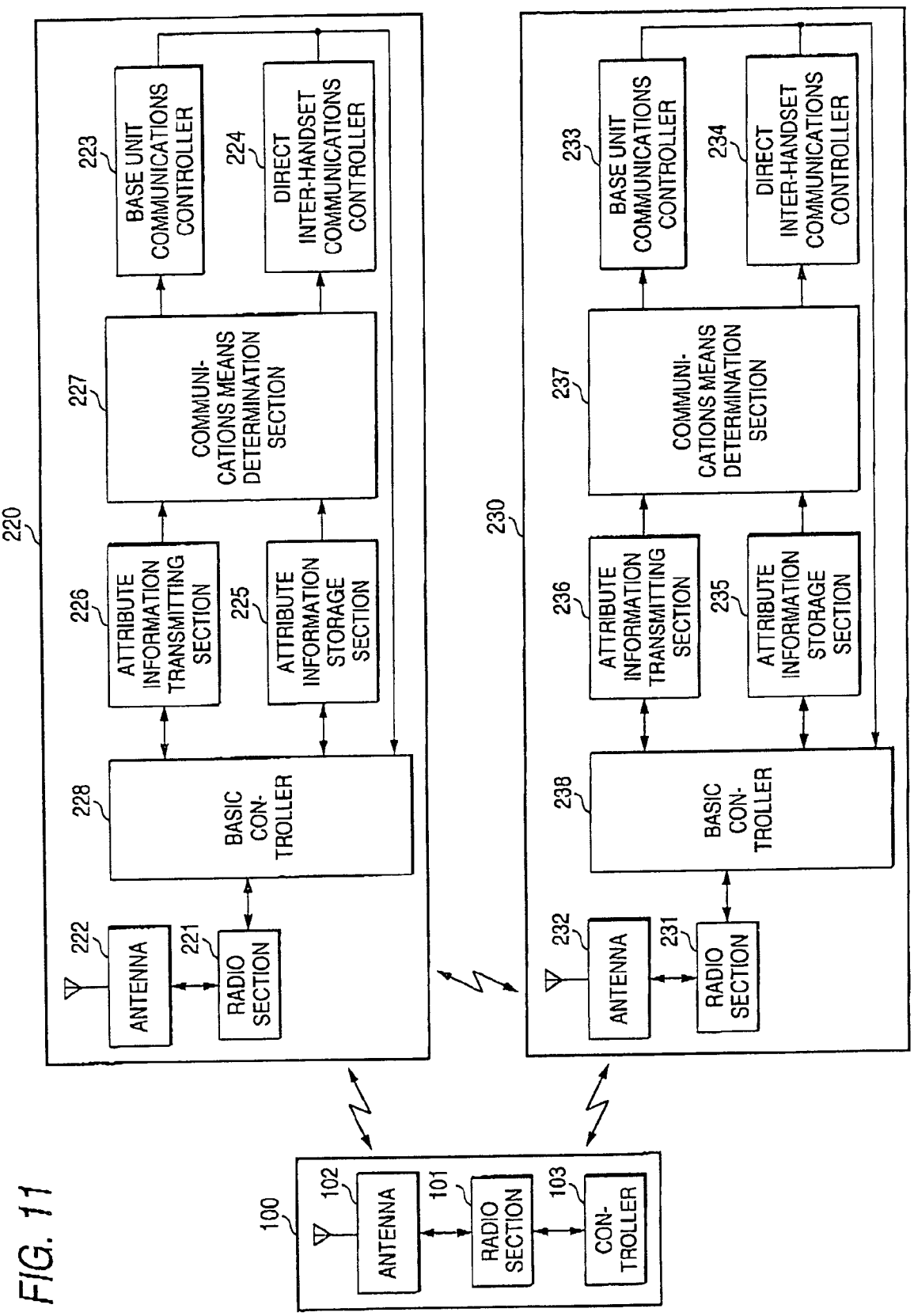
FIG. 11 is a block diagram showing digital radio communications apparatus according to Embodiment 5 of the invention.

In FIG. 1, abase unit 100, a radio section 101, an antenna 102, and a controller 103 are same as those in FIG. 11 so that they are assigned the same signs and numerals and the corresponding description is omitted. A numeral 220 designates a handset, 221 a radio section for communicating with the base unit or another handset 230 mentioned later, 222 an antenna, 223 a base unit communications controller for establishing and releasing communications with the base unit 100, 224 a direct inter-handset communications controller for establishing and releasing direct inter-handset communications, 225 a direct inter-handset communications transition controller for making control to establish direct inter-handset communications while maintaining communications with the base unit 100, and 226 a basic controller for controlling the components of the handset. The components 221 through 226 constitute the handset 220 of the digital radio communications apparatus. A numeral 230 designates a handset, 231 a radio section for communicating with the base unit or another handset 220 mentioned later, 232 an antenna, 233 a base unit communications controller for establishing and releasing communications with the base unit 100, 234 a direct inter-handset communications controller for establishing and releasing direct inter-handset communications, 235 a direct inter-handset communications transition controller for making control to establish direct inter-handset communications while maintaining communications with the base unit 100, and 236 a basic controller for controlling the components of the handset. The components 231 through 236 constitute the handset 230 of the digital radio communications apparatus.

Figure 2:
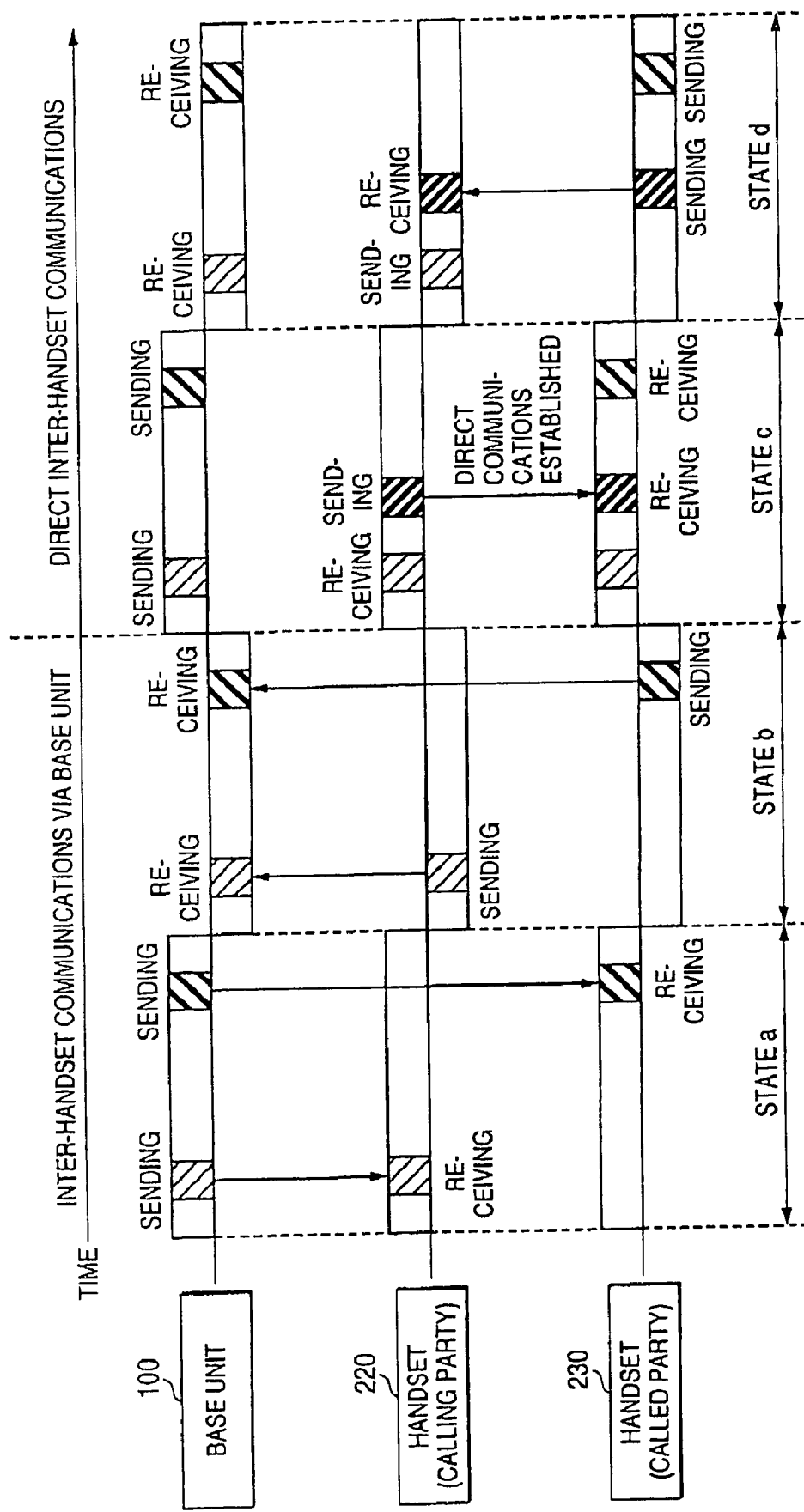
FIG. 2 is a slot use state diagram showing the use state of slots of a base unit and handsets.
Figure 3:
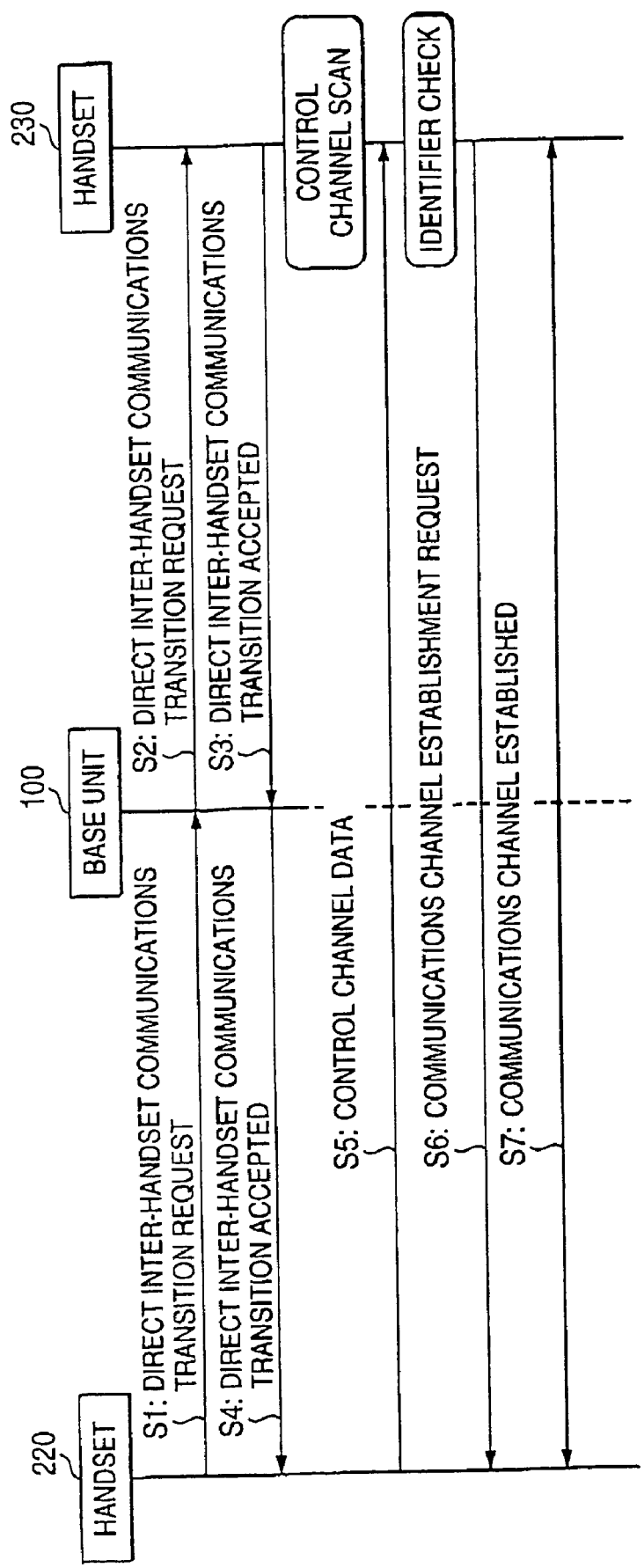
FIG. 3 is a sequence diagram showing an operation of the digital radio communications apparatus of FIG. 1.

An operation of the digital radio communications apparatus thus configured is described below referring to FIG. 2 and FIG. 3. FIG. 2 is a slot use state diagram showing the use state of the slots of the base unit 100 and the handsets 220, 230. The figure shows a use state of the slots of the base unit and handsets assumed in case direct inter-handset communications is established while inter-handset communications between the handsets 220 and 230 via the base unit 100 is being maintained. FIG. 3 is a sequence diagram showing an operation of the digital radio communications apparatus of FIG. 1.

In FIG. 2, in the state a or in the state of direct inter-handset communications via the base unit 100, the transmitting time zones of the base unit 100 are receiving time zones of the handsets 220, 230. The information transmitted from sending slots of the base unit 100 is received by a handset in its receiving slots. In a state b, the information transmitted from transmitting slots of the handsets 220, 230 is received by the base unit 100 in its receiving slots. During inter-handset communications via the base unit 100, the state a and the state b are repeated.

FIG. 3 shows a sequence assumed in case an attempt is made to establish direct inter-handset communications from the handset 220.

In FIG. 3, the base controller 226 of the handset 220 activates the direct inter-handset communications transition controller 225. The direct inter-handset communications transition controller 225 activates the direct inter-handset communications controller 224 to transmit a Direct Inter-handset Communications Transition Request message to the base unit 100 via the radio section 221 and the antenna 222 (S1). The base controller 236 of the handset 230, receiving the Direct Inter-handset Communications Transition Request message via the base unit 100, the antenna 232 and the radio section 231, transmits the Direct Inter-handset Communications Transition Request message to the direct inter-handset communications transition controller 235 (S2). Receiving the Direct Inter-handset Communications Transition Request message, the direct inter-handset communications transition controller 235 transmits the Direct Inter-handset Communications Transition Request message to the direct inter-handset communications controller 234 as well as requests the direct inter-handset communications controller 234 to scan the control channels for direct inter-handset communications in the time zones other than the slots occupied by communications with the base unit 100 out of the receiving time zones of the handset 230. The direct inter-handset communications controller 234, receiving the Direct Inter-handset Communications Transition Request message and the request, transmits a Direct Inter-handset Communications Transition Accepted message to the base unit 100 via the basic controller 234, the direct inter-handset communications transition controller 235, the radio section 231 and the antenna 232, as well as starts scanning the control channels for the direct inter-handset communications by way of control over the basic controller 236 and the radio section 231 (S3). On the other hand, the basic controller 226, receiving the Direct Inter-handset Communications Transition Accepted message via the base unit 100, the antenna 222 and the radio section 231, transmits the Direct Inter-handset Communications Transition Accepted message to the direct inter-handset communications transition controller 225 (S4). Receiving the Direct Inter-handset Communications Transition Accepted message, the direct inter-handset communications transition controller 225 acquires the vacant slot information as information on the non-transmitting slots of the base unit 100 via the basic controller 226 and the radio section 221. In case vacant slots are found, the direct inter-handset communications transition controller 225 specifies slots for transmitting control channels for direct inter-handset communications at the position of the vacant slots, and requests the direct inter-handset communications controller 224 to start transmitting the control channels for direct inter-handset communications in the receiving time zones of the handset together with the specified slot information. The direct inter-handset communications controller 224, receiving the request, starts transmitting the control channels for direct inter-handset communications in the receiving time zones of the specified handset to enter a state c in FIG. 2 (S5). The direct inter-handset communications controller 234 of the handset 230 which has scanned the control channels for direct inter-handset communications in the receiving time zones receives the control channels via the antenna 232, the radio section 231 and the basic controller 236 and transmits a communications channel establishment request in the same slot as that for the control channel thus entering a state d in FIG. 2 (S6). The channels for direct inter-handset communications are established by way of the above operation (S7).

As mentioned hereinabove, according to this embodiment, the local handset 220 comprises: a radio section 221 for performing radio communications; a base unit communications controller 223 for performing radio communications with the base unit 100; a direct inter-handset communications controller 224 for performing direct radio communications between handsets; a direct inter-handset communications transition controller 225 for making control to establish direct inter-handset communications while maintaining communications with the base unit 100 as well as transmitting control channels for direct inter-handset communications in vacant slots in the receiving time zones for communications with the base unit 100; and a basic controller 226 for controlling the components of the local handset. The distant handset 230 comprises: a radio section 231 for performing radio communications; a base unit communications controller 233 for performing radio communications with the base unit 100; a direct inter-handset communications controller 234 for performing direct radio communications between handsets; a direct inter-handset communications transition controller 235 for making control to establish direct inter-handset communications while maintaining communications with a base unit as well as scanning control channels for direct inter-handset communications in the time zones other than the slots occupied by communications with the base unit 100; and a basic controller 236 for controlling the components of the local handset. In this way, the calling handset (local handset) 220 uses the vacants lots in the receiving time zones for communications with the base unit 100 to transmit the control channels for inter-handset communications. The called handset (distant handset) 230 scans the control channels for direct inter-handset communications in the time zones other than the slots occupied by communications with the base unit 100 out of the receiving time zones for communications with the base unit 100. Thus it is possible to activate direct inter-handset communications while maintaining communications with the base unit 100 without disturbing communications with the base unit 100 in establishing direct inter-handset communications. It is also possible to smoothly make a transition from inter-handset communications via the base unit 100 to direct inter-handset communications, and switch to inter-handset communications via the base unit 100 without releasing the ongoing communications by using the slots for communications with the base unit 100 even in case direct inter-handset communications cannot be established.

Embodiment 2

Figure 4:
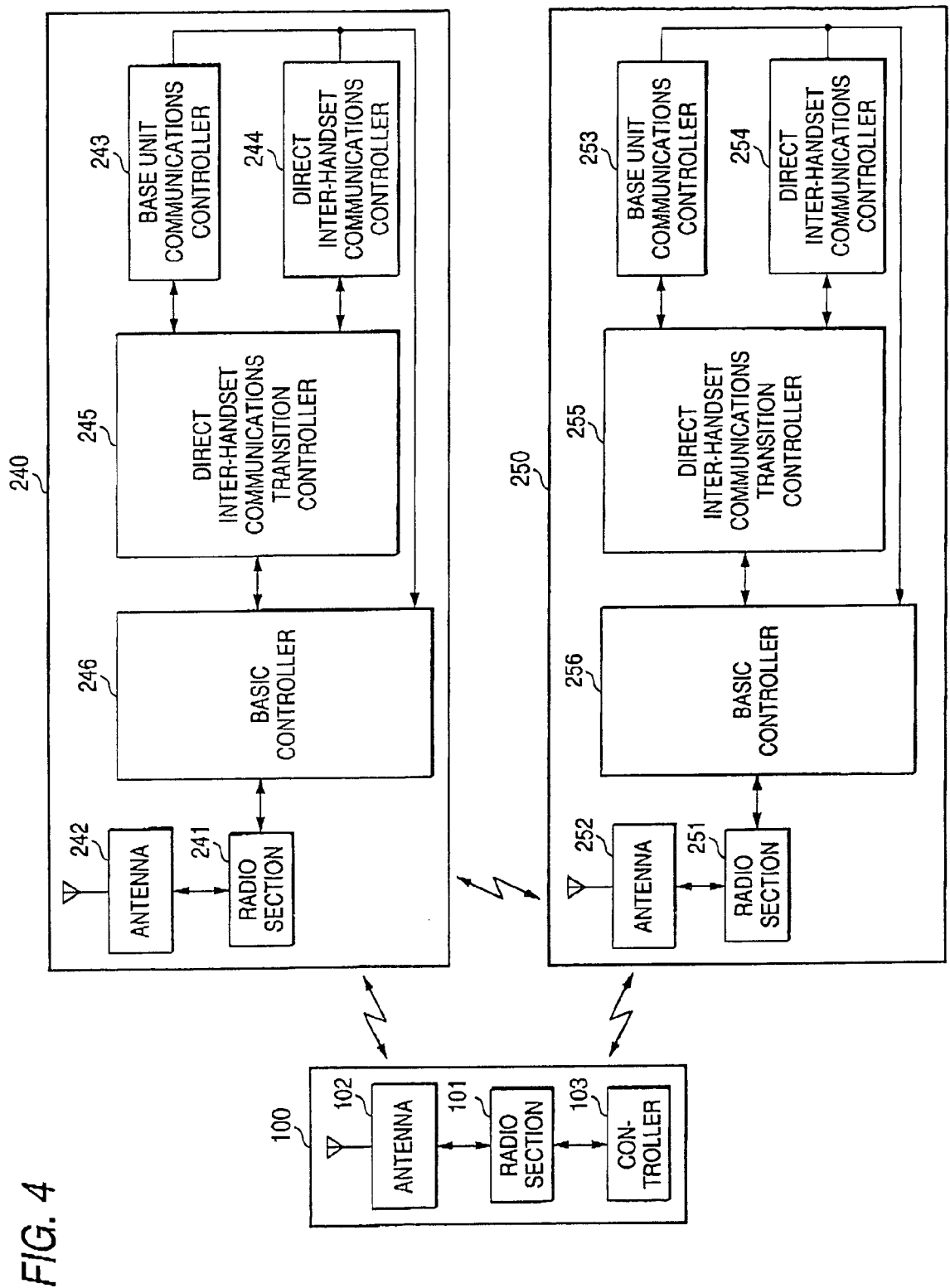
FIG. 4 is a block diagram showing digital radio communications apparatus according to Embodiment 2 of the invention.

FIG. 4 is a block diagram showing digital radio communications apparatus according to Embodiment 2 of the invention.

In FIG. 4, a base unit 100, a radio section 101, an antenna 102, and a controller 103 are same as those in FIG. 11 so that they are assigned the same signs and numerals and the corresponding description is omitted. A numeral 240 designates a handset, 241 a radio section for communicating with the base unit 100 or another handset 250 mentioned later, 242 an antenna, 243 a base unit communications controller for establishing and releasing communications with the base unit 100, 244 a direct inter-handset communications controller for establishing and releasing direct inter-handset communications, 245 a direct inter-handset communications transition controller for making control to establish direct inter-handset communications while maintaining communications with the base unit 100 as well as determining whether to release or maintain communications with the base unit 100 depending on the success or failure of establishment of direct inter-handset communications, and 246 a basic controller for controlling the components of the handset. The components 241 through 246 constitute the handset 240 of the digital radio communications apparatus. A numeral 250 designates a handset, 251 a radio section for communicating with the base unit 100 or another handset 240, 252 an antenna, 253 a base unit communications controller for establishing and releasing communications with the base unit 100, 254 a direct inter-handset communications controller for establishing and releasing direct inter-handset communications, 255 a direct inter-handset communications transition controller for making control to establish direct inter-handset communications while maintaining communications with the base unit 100, and 256 a basic controller for controlling the components of the handset. The components 251 through 256 constitute the handset 250 of the digital radio communications apparatus.

Figure 5:
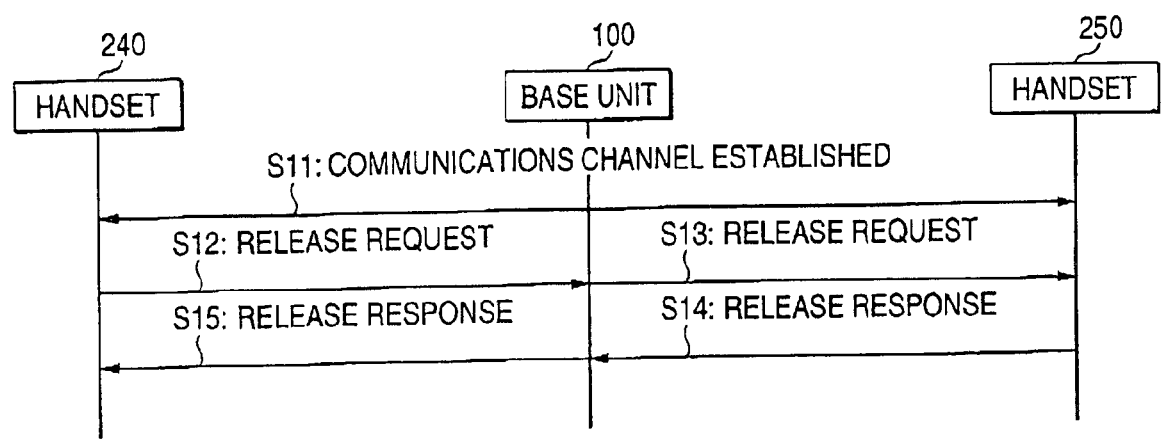
FIG. 5 is a sequence diagram showing an operation of the digital radio communications apparatus of FIG. 4.

An operation of the digital radio communications apparatus thus configured is described below referring to FIG. 5. FIG. 5 is a sequence diagram showing an operation of the digital radio communications apparatus of FIG. 4.

In case the channels for direct inter-handset communications has been successfully established (S11) in the same operation as that of Embodiment 1 (S11), the direct inter-handset communications controller 244 communicates the successful establishment of direct inter-handset communications to the direct inter-handset communications transition controller 245. Receiving this information, the direct inter-handset communications transition controller 245 assumes a transition from inter-handset communications via the base unit 100 to direct inter-handset communications and activates the release of inter-handset communications via the base unit 100 and requests the base unit communications controller 243 to transmit a Release Request message to the base unit 100 (S12). Receiving the Release Request message, the base unit 100 transmits the Release Request message to the handset 250 (S13). Receiving the Release Request message, the basic controller 256 of the handset 250 transmits the Release Request message to the base unit communications controller 253 via the direct inter-handset communications transition controller 255. Receiving the Release Request message, the base unit communications controller 253 transmits a Release Response message to the base unit 100 (S14). Receiving the Release Response message via the base unit 100 (S15), the basic controller 246 of the handset 240 transmits the Release Response message to the base unit communications controller 243 via the direct inter-handset communications transition controller 245. The direct inter-handset communications transition controller 245 receives the Release Response message and recognizes the completion of inter-handset communications via the base unit 100.

In case the handset 250 has failed to receive control channel data or in case it is determined that the direct inter-handset communications controller 254 has failed to establish the channels for direct inter-handset communications due to an error after the communications channel establishment request was transmitted, the failure of establishment of direct inter-handset communications is communicated from the direct inter-handset communications controller 254 to the direct inter-handset communications transition controller 255. Receiving this information, the direct inter-handset communications transition controller 255 recognizes the failure of establishment of direct inter-handset communications and maintains inter-handset communications via the base unit 100. The same processing is made on the handset 240 to release direct inter-handset communications and only inter-handset communications via the base unit 100 are restored.

As mentioned hereinabove, according to this embodiment, the local handset 240 comprises: a radio section 241 for performing radio communications; a base unit communications controller 243 for performing radio communications with the base unit 100; a direct inter-handset communications controller 244 for performing direct radio communications between handsets; a direct inter-handset communications transition controller 245 for making control to establish direct inter-handset communications while maintaining communications with the base unit 100 as well as determining whether to release or maintain communications with the base unit 100 depending on the success or failure of establishment of direct inter-handset communications; and a basic controller 246 for controlling the components of the local handset. The direct inter-handset communications transition controller 245 releases radio communications with the base unit 100 in case direct inter-handset communications has been successfully established, and maintains inter-handset communications via the base unit 100 in case direct inter-handset communications cannot be established, thereby making control to establish direct inter-handset communications while maintaining communications with the base unit 100. Thus it is possible to activate direct inter-handset communications while maintaining communications with the base unit 100 without disturbing communications with the base unit 100 in establishing direct inter-handset communications. In case direct inter-handset communications has been successfully established, radio communications with the base unit are released. In case direct inter-handset communications cannot be established, inter-handset communications via the base unit 100 are maintained. Thus it is possible to switch to inter-handset communications via the base unit 100 without releasing the ongoing communications even in case direct inter-handset communications cannot be established.

Embodiment 3

Figure 6:
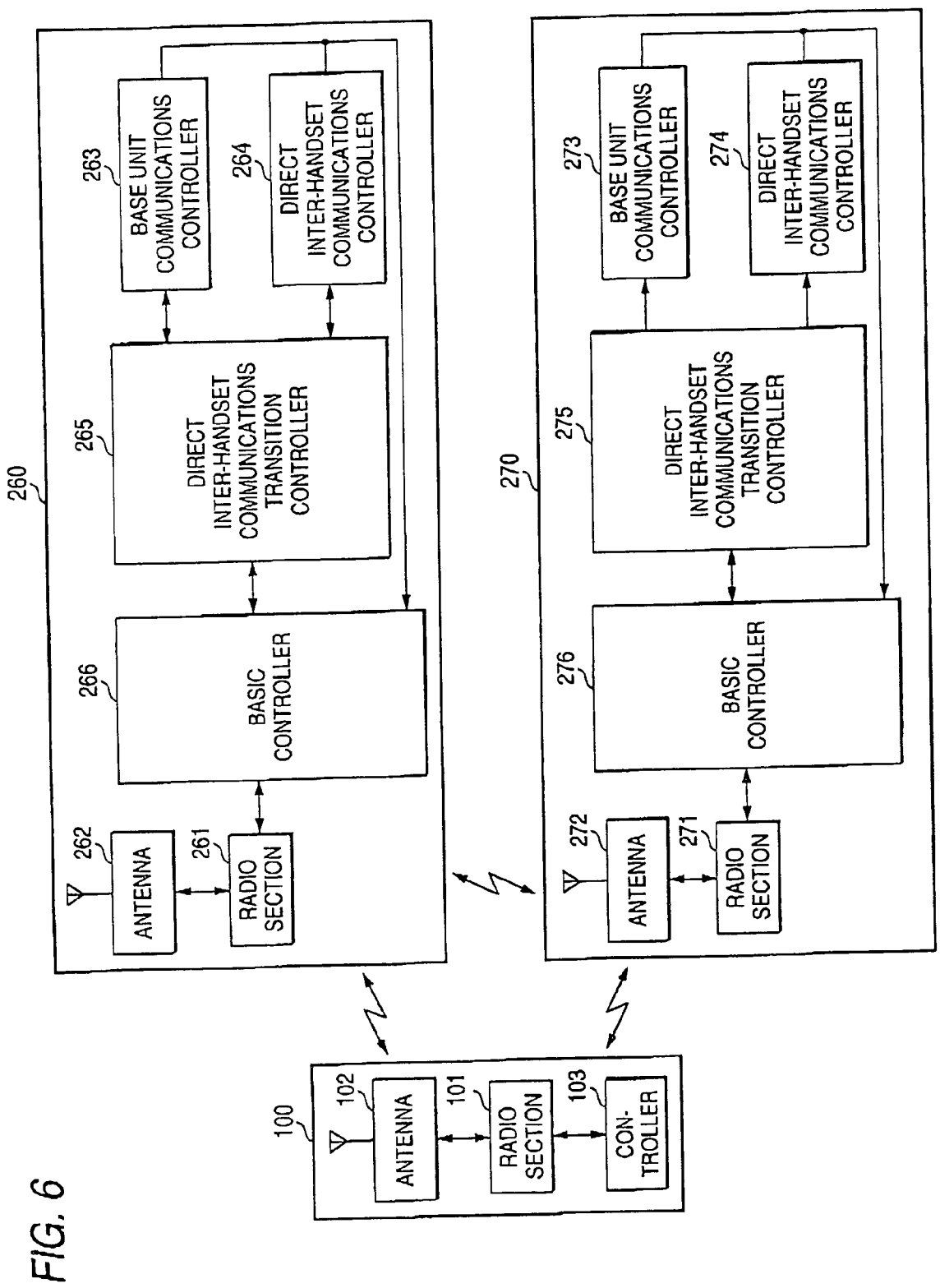
FIG. 6 is a block diagram showing digital radio communications apparatus according to Embodiment 3 of the invention.

FIG. 6 is a block diagram showing digital radio communications apparatus according to Embodiment 3 of the invention.

In FIG. 6, abase unit 100, a radio section 101, an antenna 102, and a controller 103 are same as those in FIG. 11 so that they are assigned the same signs and numerals and the corresponding description is omitted. A numeral 260 designates a handset, 261 a radio section for communicating with the base unit 100 or another handset 270 mentioned later, 262 an antenna, 263 a base unit communications controller for establishing and releasing communications with the base unit 100, 264 a direct inter-handset communications controller for establishing and releasing direct inter-handset communications, 265 a direct inter-handset communications transition controller for performing the same operation as that of Embodiments 1, 2 as well as requesting notification of the channels used by the distant handset and the base unit 100 or communicating the channels used by the distant handset and the base unit 100 requested and checking whether the channels transmitted from the distant handset to the base unit 100 can be received, and 266 a basic controller for controlling the components of the handset. The components 261 through 266 constitute the handset 260 of the digital radio communications apparatus. A numeral 270 designates a handset, 271 a radio section for communicating with the base unit 100 or another handset 260, 272 an antenna, 273 a base unit communications controller for establishing and releasing communications with the base unit 100, 274 a direct inter-handset communications controller for establishing and releasing direct inter-handset communications, 275 a direct inter-handset communications transition controller for making control to establish direct inter-handset communications while maintaining communications with the base unit 100, and 276 a basic controller for controlling the components of the handset. The components 271 through 276 constitute the handset 270 of the digital radio communications apparatus.

Figure 7:
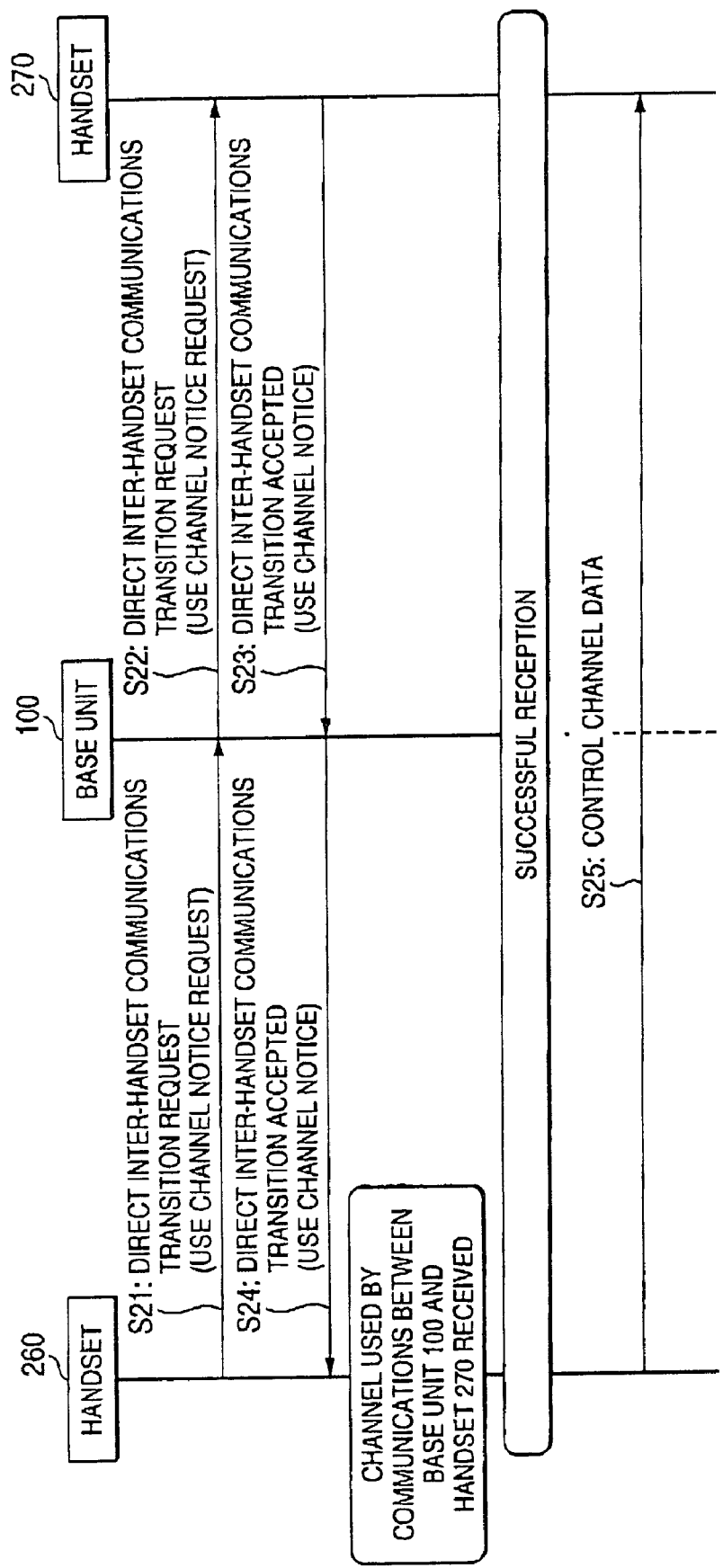
FIG. 7 is a sequence diagram showing an operation of the digital radio communications apparatus of FIG. 6.

An operation of the digital radio communications apparatus thus configured is described below referring to FIG. 7. FIG. 7 is a sequence diagram showing an operation of the digital radio communications apparatus of FIG. 6.

In FIG. 7, in case a transition to direct inter-handset communications is activated by the handset 260, the basic controller 266 of the handset 260 activates the direct inter-handset communications transition controller 265. The direct inter-handset communications transition controller 265 activates the direct inter-handset communications controller 264 and transmits a Direct Inter-handset Communications Transition Request message to the base unit 100 via the radio section 261 and the antenna 262 (S21). The direct inter-handset communications transition controller 265 attaches information to request notification of the channels used by the base unit 100 and the handset 270 to the Direct Inter-handset Communications Transition Request message. The basic controller 276 of the handset 270, receiving the Direct Inter-handset Communications Transition Request message via the base unit 100, the antenna 272 and the radio section 271 (S22), transmits the Direct Inter-handset Communications Transition Request message to the direct inter-handset communications transition controller 275. Receiving the Direct Inter-handset Communications Transition Request message, the direct inter-handset communications transition controller 275 acquires and transmits to the direct inter-handset communications controller 274 the information on the channels used by communications between the local handset and the base unit together with the Direct Inter-handset Communications Transition Request message. Receiving the Direct Inter-handset Communications Transition Request message, the direct inter-handset communications controller 274 transmits a Direct Inter-handset Communications Transition Accepted message together with the information on the channels used by communications between the local handset and the base unit to the base unit 100 via the basic controller 276, the direct inter-handset communications transition controller 275, the radio section 271 and the antenna 272 (523). Receiving the Direct Inter-handset Communications Transition Accepted message via the base unit 100, the antenna 262 and the radio section 261 (S24), the basic controller 266 transmits the Direct Inter-handset Communications Transition Accepted message to the direct inter-handset communications transition controller 265. Receiving the Direct Inter-handset Communications Transition Accepted message, the direct inter-handset communications transition controller 265 receives via the basic controller 266 and the radio section 261 the channels used by the handset 270 for transmission to the base unit 100. That is, the direct inter-handset communications transition controller 265 receives the radio wave transmitted from the antenna 272 of the handset 270 via the antenna 262 of the handset 260. The reception is not made not to grasp the content of communications but to check for a radio wave based on the detected field strength. In case the reception is successful, or presence a radio wave of some strength is confirmed, the direct inter-handset communications transition controller 265 determines that a radio wave from the handset 270 can be received and subsequently performs the same operation as that in Embodiment 1 to establish direct inter-handset communications (S25). In case the channels used by the handset 270 for transmission to the base unit 100 cannot be received, the handset 260 does not transmit control channels for direct inter-handset communications nor activates direct inter-handset communications.

Figure 8:
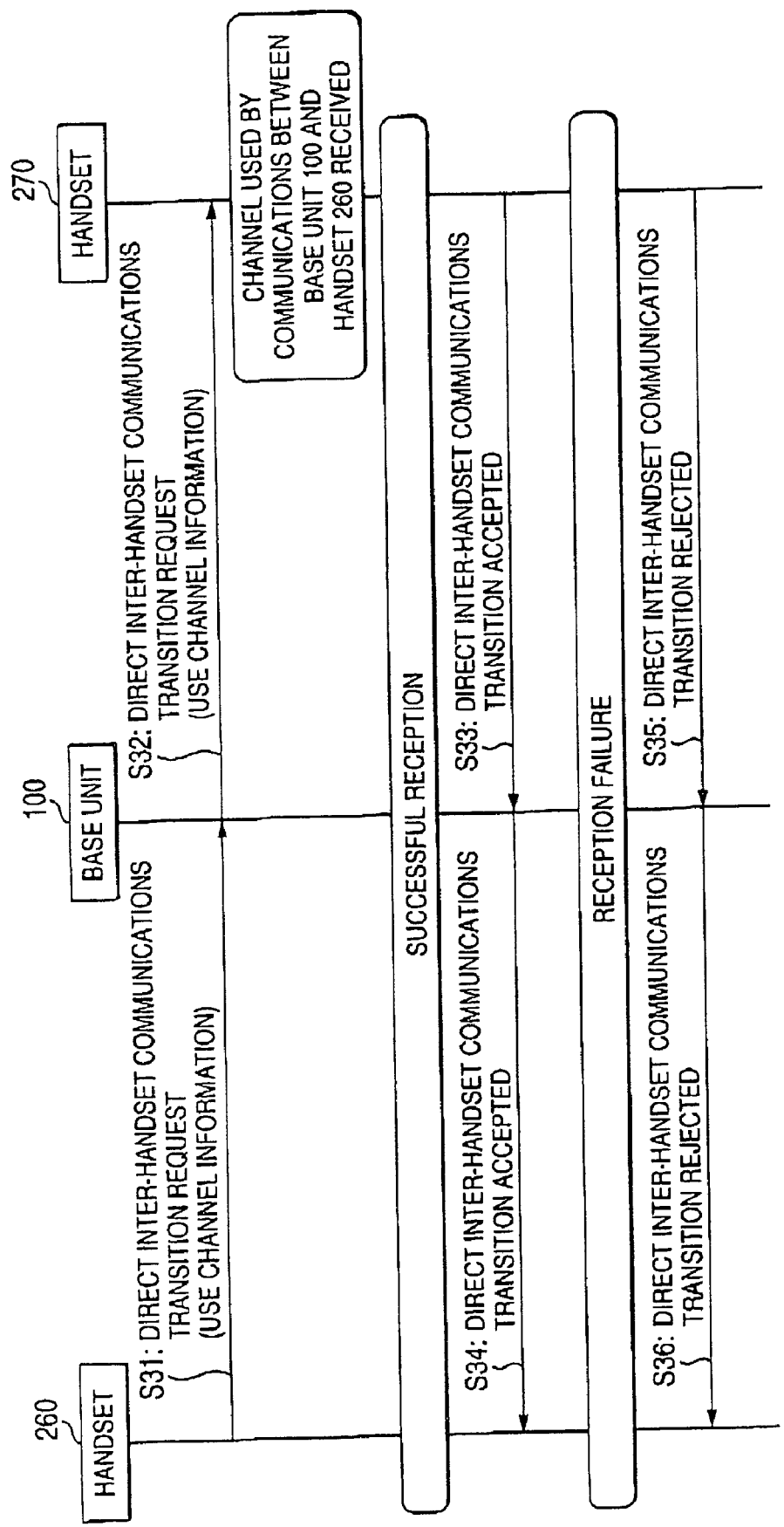
FIG. 8 is a sequence diagram showing another operation of the digital radio communications apparatus of FIG. 6.

FIG. 8 is a sequence diagram showing another operation of the digital radio communications apparatus of FIG. 6.

In FIG. 8, in case the direct inter-handset communications transition controller 265 of the handset 260 activates the direct inter-handset communications controller 264 to transmit a Direct Inter-handset Communications Transition Request message, the direct inter-handset communications transition controller 265 attaches the information on the channels used by the local handset for communications with the base unit 100 (S31). Receiving the Direct Inter-handset Communications Transition Request message and the attached information via the base unit 100 (S32), the direct inter-handset communications transition controller 275 of the handset 270 receives the channels used by the local handset for communications with the base unit 100. In case the reception is successful, the direct inter-handset communications transition controller 275 transmits a Direct Inter-handset Communications Transition Accepted message to the handset 260 via the base unit 100 (S33, S34) to establish direct inter-handset communications. In case the reception is unsuccessful, the direct inter-handset communications transition controller 275 transmits a Direct Inter-handset Communications Transition Rejected message (S35, S36) and maintains inter-handset communications via the base unit without establishing direct inter-handset communications.

As mentioned hereinabove, according to this embodiment, the base unit 100 comprises: a radio section 101 for performing radio communications; and a controller 103 for controlling the components as well as communicating to the local handset 260 the channels used by the distant handset as channels used by the distant handset 270 and the base unit 100 communicated from the distant handset 270. The local handset 260 comprises: a radio section 261 for performing radio communications; a base unit communications controller 263 for performing radio communications with the base unit 100; a direct inter-handset communications controller 264 for performing direct radio communications between handsets; a direct inter-handset communications transition controller 265 for making control to establish direct inter-handset communications while maintaining communications with the base unit 100, determining whether to release or maintain communications with the base unit 100 depending on the success or failure of establishment of direct inter-handset communications, requesting the base unit 100 to communicate the channels used by the distant handset 270, and checking whether the channels transmitted from the distant handset 270 to the base unit 100 can be received in the channels used by the distant handset at a transition to direct inter-handset communications; and a basic controller 266 for controlling the components of the local handset. As a result, the local handset 260 checks whether the channels transmitted from the distant handset 270 to the base unit 100 can be received at a transition to direct inter-handset communications. Thus it is possible to check, before establishment of direct inter-handset communications, whether direct inter-handset communications between the local handset 260 and the distant handset 270 is allowed.

The base unit 100 comprises: a radio section 101 for performing radio communications; and a controller 103 for controlling the components as well as communicating to the distant handset 270 the channels used by the local handset as channels used by the local handset 260 and the base unit 100 communicated from the local handset 260. The local handset 260 comprises: a radio section 261 for performing radio communications; a base unit communications controller 263 for performing radio communications with the base unit 100; a direct inter-handset communications controller 264 for performing direct radio communications between handsets; a direct inter-handset communications transition controller 265 for making control to establish direct inter-handset communications while maintaining communications with the base unit 100, determining whether to release or maintain communications with the base unit 100 depending on the success or failure of establishment of direct inter-handset communications, and requesting the base unit 100 to communicate the channels used by the local handset requested; and a basic controller 266 for controlling the components of the local handset. The distant handset 270 comprises: a radio section 271 for performing radio communications; a base unit communications controller 273 for performing radio communications with the base unit 100; a direct inter-handset communications controller 274 for performing direct radio communications between handsets; a direct inter-handset communications transition controller 275 for making control to establish direct inter-handset communications while maintaining communications with the base unit 100, determining whether to release or maintain communications with the base unit depending on the success or failure of establishment of direct inter-handset communications, and checking whether the channels transmitted from the distant handset to the base unit 100 can be received at a transition to direct inter-handset communications; and a basic controller 276 for controlling the components of the distant handset. As a result, the distant handset 270 checks whether the channels transmitted from the local handset 260 to the base unit 100 can be received at a transition to direct inter-handset communications. Thus it is possible to check, before establishment of direct inter-handset communications, whether direct inter-handset communications between the local handset 260 and the distant handset 270 is allowed.

Embodiment 4

Figure 9:
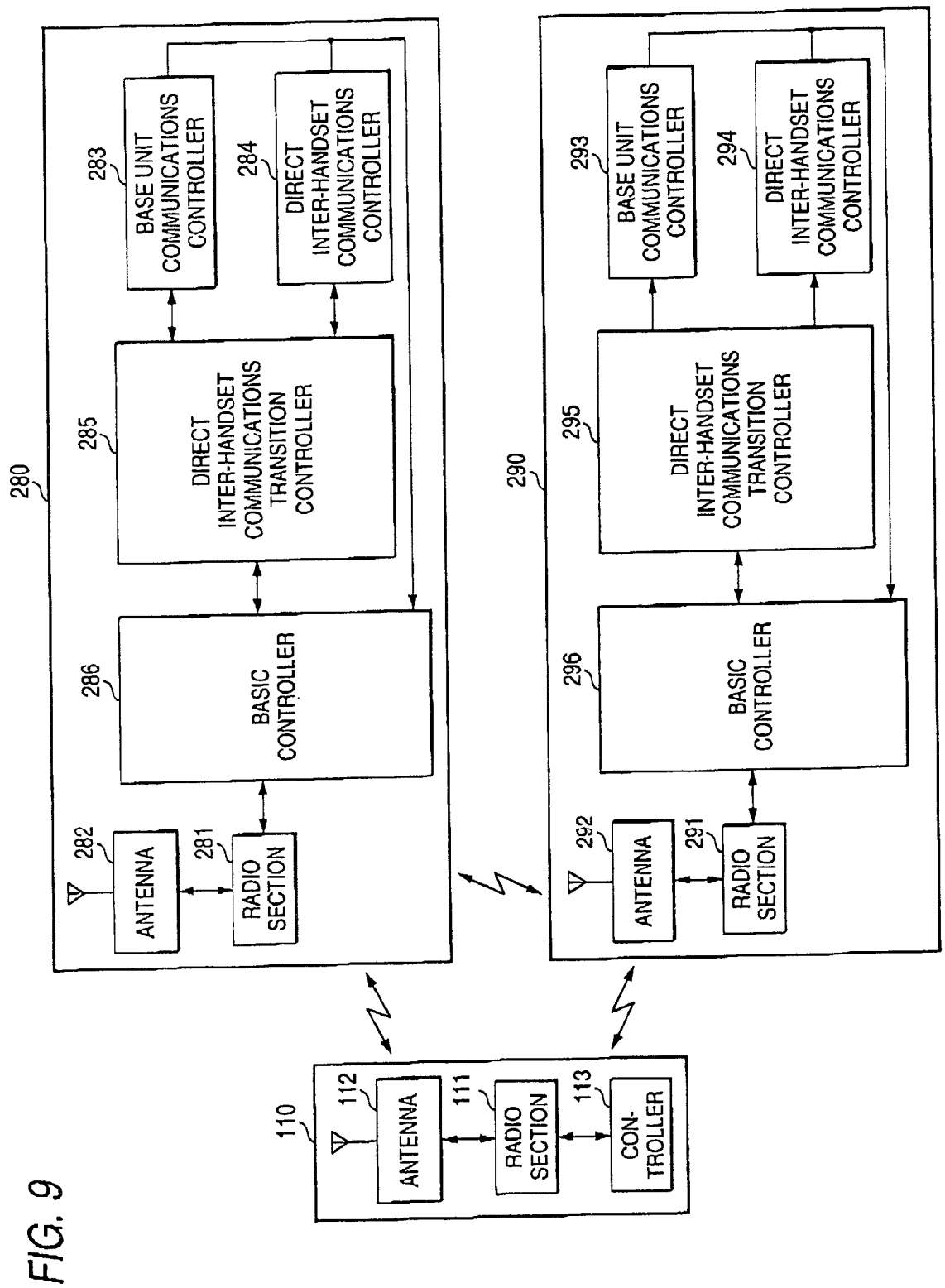
FIG. 9 is a block diagram showing digital radio communications apparatus according to Embodiment 4 of the invention.

FIG. 9 is a block diagram showing digital radio communications apparatus according to Embodiment 4 of the invention.

In FIG. 9, a numeral 111 designates a radio section for performing radio communications with handsets 280, 290 mentioned later, 112 an antenna, and 113 a controller for controlling the components of a base unit as well as communicating the channels used for communications with a distant handset in response to an inquiry from a local handset. The components 111 through 113 constitute a base unit 110. A numeral 280 designates a handset, 281 a radio section for communicating with the base unit 110 or another handset 290 (mentioned later), 282 an antenna, 283 a base unit communications controller for establishing and releasing communications with the base unit 110, 284 a direct inter-handset communications controller for establishing and releasing direct inter-handset communications, 285 a direct inter-handset communications transition controller for performing the same operation as that of Embodiments 1, 2, requesting the base unit 110 to communicate the channels used by the distant handset and the base unit 110, and checking whether the channels transmitted from the distant handset to the base unit 110 can be received, and 286 a basic controller for controlling the components of the handset. The components 281 through 286 constitute the handset 280 of the digital radio communications apparatus. A numeral 290 designates a handset, 291 a radio section for communicating with the base unit 110 or another handset 280, 292 an antenna, 293 a base unit communications controller for establishing and releasing communications with the base unit 110, 294 a direct inter-handset communications controller for establishing and releasing direct inter-handset communications, 295 a direct inter-handset communications transition controller for making control to establish direct inter-handset communications while maintaining communications with the base unit 110, and 296 a basic controller for controlling the components of the handset. The components 291 through 296 constitute the handset 290 of the digital radio communications apparatus.

Figure 10:
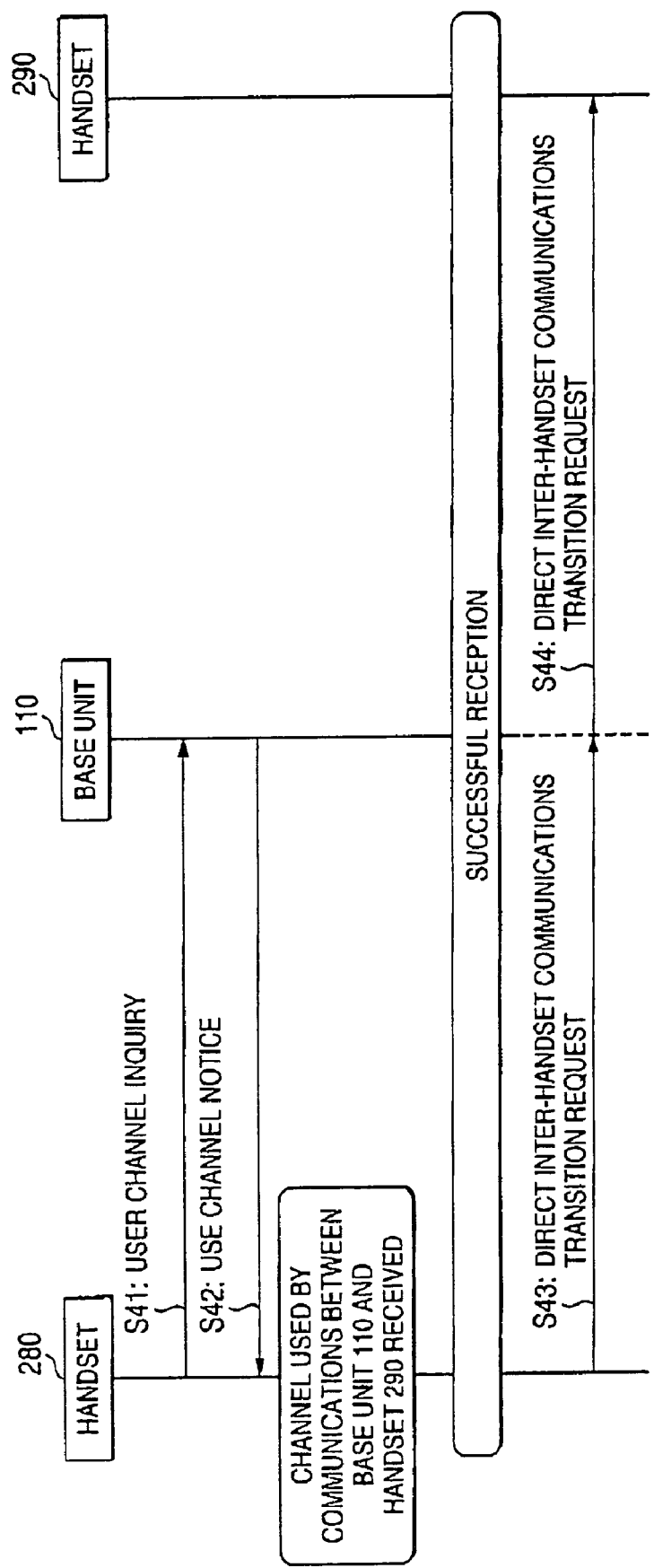
FIG. 10 is a sequence diagram showing an operation of the digital radio communications apparatus of FIG. 9.

An operation of the digital radio communications apparatus thus configured is described below referring to FIG. 10. FIG. 10 is a sequence diagram showing an operation of the digital radio communications apparatus of FIG. 9.

In FIG. 10, in case a transition to direct inter-handset communications is activated by the handset 280, the basic controller 286 of the handset 280 activates the direct inter-handset communications transition controller 285. The direct inter-handset communications transition controller transmits to the base unit 110 a message to inquire about the channels used by the base unit 110 and the handset 290 (S41). Receiving the Use Channel Inquiry message, the controller 113 of the base unit 110 transmits the information on the channels used by the base unit 110 and the handset 290 to the handset 280 (S42). Receiving the information, the direct inter-handset communications transition controller 285 receives, via the basic controller 285 and the radio section 281, the channels used by the handset 290 for communications with the base unit 110. In case the reception is successful, or presence a radio wave of some strength is confirmed, the direct inter-handset communications transition controller 285 determines that a radio wave from the handset 290 can be received and transmits a Direct Inter-handset Communications Transition Request message to the handset 290 via the base unit 110 (S43, S44), and subsequently performs the same operation as that in Embodiment 1 to establish direct inter-handset communications. In case the channels used by the handset 290 for transmission to the base unit 110 cannot be received, the handset 290 does not transmit a Direct Inter-handset Communications Transition Request message nor activates direct inter-handset communications.

As mentioned hereinabove, this embodiment provides digital radio communications apparatus comprising: a base unit 110 and handsets 280, 290 communicable with the base unit 110; characterized in that the handset comprises: a radio section 281 for performing radio communications; a base unit communications controller 283 for performing radio communications with the base unit 110; a direct inter-handset communications controller 284 for performing direct radio communications between handsets; a direct inter-handset communications transition controller 285 for making control to establish direct inter-handset communications while maintaining communications with the base unit 110, determining whether to release or maintain communications with the base unit 110 depending on the success or failure of establishment of direct inter-handset communications, requesting the base unit 110 to communicate the channels used by a distant handset 290 and the base unit 110, and checking whether the channels transmitted from the distant handset 290 to the base unit 110 can be received in the requested channels used; and a basic controller 286 for controlling the components of the handset 281; that the base unit 110 comprises: a radio section 111 for performing radio communications; and a controller 113 for controlling the components of the base unit 110 as well as communicating the channels used for communications with a distant handset in response to an inquiry from the local handset; and that the direct inter-handset communications transition controller 285 checks whether the channels transmitted from the distant handset 290 to the base unit 110 can be received at a transition to direct inter-handset communications. Thus it is possible to check whether the channels transmitted from the distant handset 290 to the base unit 110 (channels communicated by the base unit 110) can be received by the local handset 280 at a transition to direct inter-handset communications. Thus it is possible to check, before establishment of direct inter-handset communications, whether direct inter-handset communications between the local handset 280 and the distant handset 290 is allowed.

Embodiment 5

FIG. 11 is a block diagram showing digital radio communications apparatus according to Embodiment 5 of the invention.

In FIG. 11, a base unit 100, a radio section 101, an antenna 102, and a controller 103 are same as those in FIG. 23 so that they are assigned the same signs and numerals and the corresponding description is omitted. A numeral 220 designates a handset, 221 a radio section for performing radio communications with the base unit 100 or another handset 230 mentioned later, 222 an antenna, 223 a base unit communications controller, 224 a direct inter-handset communications controller, 225 an attribute information storage section for storing a communications type provided by a local handset, 226 an attribute information transmitting section for communicating to a distant handset the communications type provided by the local handset and receiving the communications type provided by the distant handset, 227 a communications means determination section for determining whether to maintain communications via the base unit or activate direct inter-handset communications based on the attribute information of the local handset and the attribute information of the distant handset, and 228 a basic controller for controlling the components of the handset. The components 221 through 228 constitute the handset 220 of the digital radio communications apparatus. A numeral 230 designates a handset, 231 a radio section for communicating with the base unit 100 or another handset 220 (mentioned later), 232 an antenna, 233 a base unit communications controller, 234 a direct inter-handset communications controller, 235 an attribute information storage section for storing a communications type provided by a local handset, 236 an attribute information transmitting section for communicating to a distant handset the communications type provided by the local handset and receiving the communications type provided by the distant handset, 237 a communications means determination section for determining whether to maintain communications or activate direct inter-handset communications based on the attribute information of the local handset and the attribute information of the distant handset, and 238 a basic controller for controlling the components of the handset. The components 231 through 238 constitute the handset 230 of the digital radio communications apparatus.

Figure 13:
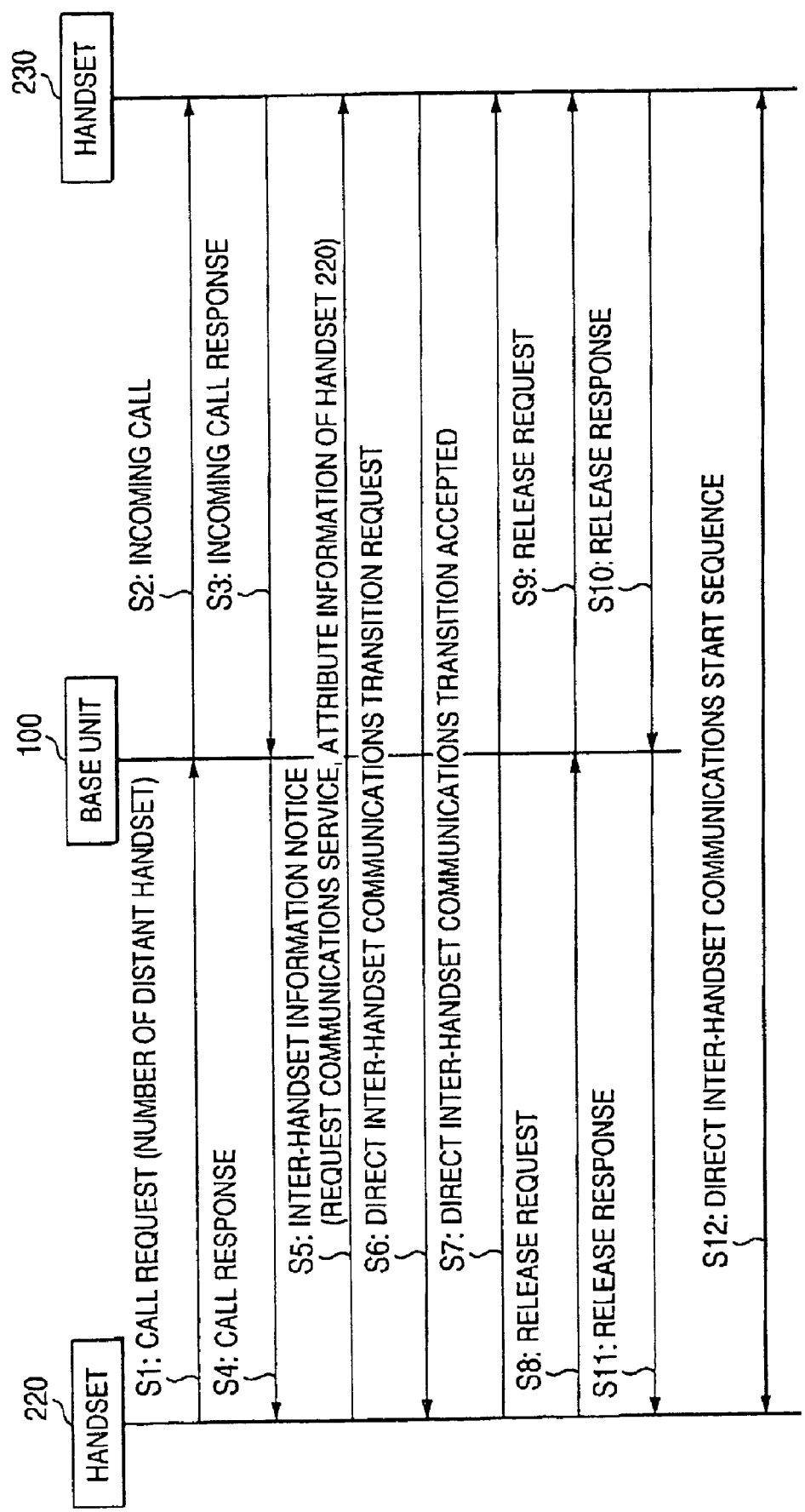
FIG. 13 is a sequence diagram showing an operation of the digital radio communications apparatus of FIG. 11.

An operation of the digital radio communications apparatus thus configured is described below referring to FIGS. 12 and 13. FIG. 12 is a data diagram showing attribute information. FIG. 13 is a sequence diagram showing an operation of the digital radio communications apparatus of FIG. 11.

The attribute information storage sections 225 and 235 of the handsets 220 and 230 store the attribute information of the local handset shown in FIG. 12. The attribute information type "Transmission capability" indicates a supported type of communications such as voice and data communications The type "Number of simultaneously available slots" indicates the maximum number of slots simultaneously available to a single communications practice. The type "Direct inter-handset communications" indicates whether direct inter-handset communications can be activated. The type "High-layer capability" indicates a communications service type of a handset, such as a camera function, a monitor function, a serial communications function and a wireless LAN function.

FIG. 13 shows an exemplary sequence where the handsets 220 and 230 having the attribute information shown in FIG. 12 make a transition from inter-handset communications via the base unit 100 to direct inter-handset communications.

In FIG. 13, the basic controller 228 of the handset 220 transmits a Call Request message to the base unit 100 via the radio section 221 and the antenna 222 (S1). The Call Request message contains specification of the handset as a distant party. Receiving the Call Request message, the base unit 100 transmits an Incoming Call message to the handset 210 specified as a distant party in the Call Request message (S2). Receiving the Incoming Call message via the antenna 232 and the radio section 231, the basic controller 238 of the handset 230 transmits an Incoming Call Response message to the base unit 100 via the radio section 231 and the antenna 232 to start communications with the base unit 100 (S3). The base unit 100 which received the Incoming Call Response message and established communications with the handset 230 transmits a Call Response message to the handset 220 indicating that communications with the distant handset 230 have been established (S4). Receiving the Call Response message, the basic controller 228 of the handset 220 fetches the attribute information of the local handset from the attribute information storage section 228 and transmits the attribute information of the local handset as an Inter-handset Information Notice message via the attribute information transmitting section 226, the radio section 221 and the antenna 222 (S5). This message contains a service type requested by the user, such as voice and data. Receiving the Inter-handset Information Notice message via the radio section 231 and the antenna 232, the basic controller 238 of the handset 230 transmits the Inter-handset Information Notice message to the attribute information transmitting section 236. Receiving the Inter-handset Information Notice message, the attribute information transmitting section 236 fetches the attribute information of the handset 220 and service type requested by the user from the Inter-handset Information Notice message and transmits the information to the communications means determination section 237. The communications means determination section 237 fetches the attribute information of the local handset from the attribute information storage section 235 which stores the attribute information of the local handset and compares the attribute information with that of the handset 220. The communications means determination section 237 then determines an available communications type based on the comparison and the requested service type. In case the communications means determination section 237 has determined that direct inter-handset communications are appropriate, it activates the direct inter-handset communications controller 234 and transmits a Direct Inter-handset Communications Transition Request message (S6). The communications means determination section 237 subsequently performs the same processing as the related art (S1 through S11) to establish direct inter-handset communications between the handset 220 and the handset 230 (S12). The steps S7 through S11 correspond to the steps S105 through S109 in FIG. 23. The step S12 corresponds to the steps S110 through S116 in FIG. 23.

As mentioned hereinabove, according to this embodiment, the handset 220 comprises: a radio section 221 for performing radio communications; abase unit communications controller 223 for performing radio communications with the base unit 100; a direct inter-handset communications controller 224 for performing direct radio communications between handsets; an attribute information storage section 225 for storing a communications type provided by the local handset; an attribute information transmitting section 226 for communicating the communications type provided by the local handset to the distant handset as well as receiving the communications type provided by the distant handset; a communications means determination section 227 for determining whether to maintain inter-handset communications via the base unit 100 or activate direct inter-handset communications based on the attribute information of the local handset and the attribute information of the distant handset; and a basic controller 228 for controlling the components of the handset; characterized in that the communications means determination section 227 recognizes a communication type supported by the handsets and determines whether to make a transition to direct inter-handset communications or maintain inter-handset communications via the base unit 100 based on the recognized communications type. Thus the communications means determination section 227 is used to recognize a communications type supported by the handsets. It is thus possible to determine whether to make a transition to direct inter-handset communications or maintain inter-handset communications via the base unit 100 by way of a function specific to a handset, without using a special function of the base unit 100. In case a plurality of communications types are available, it is also possible to select and provide an optimum communications type.

Embodiment 6

Figure 14:
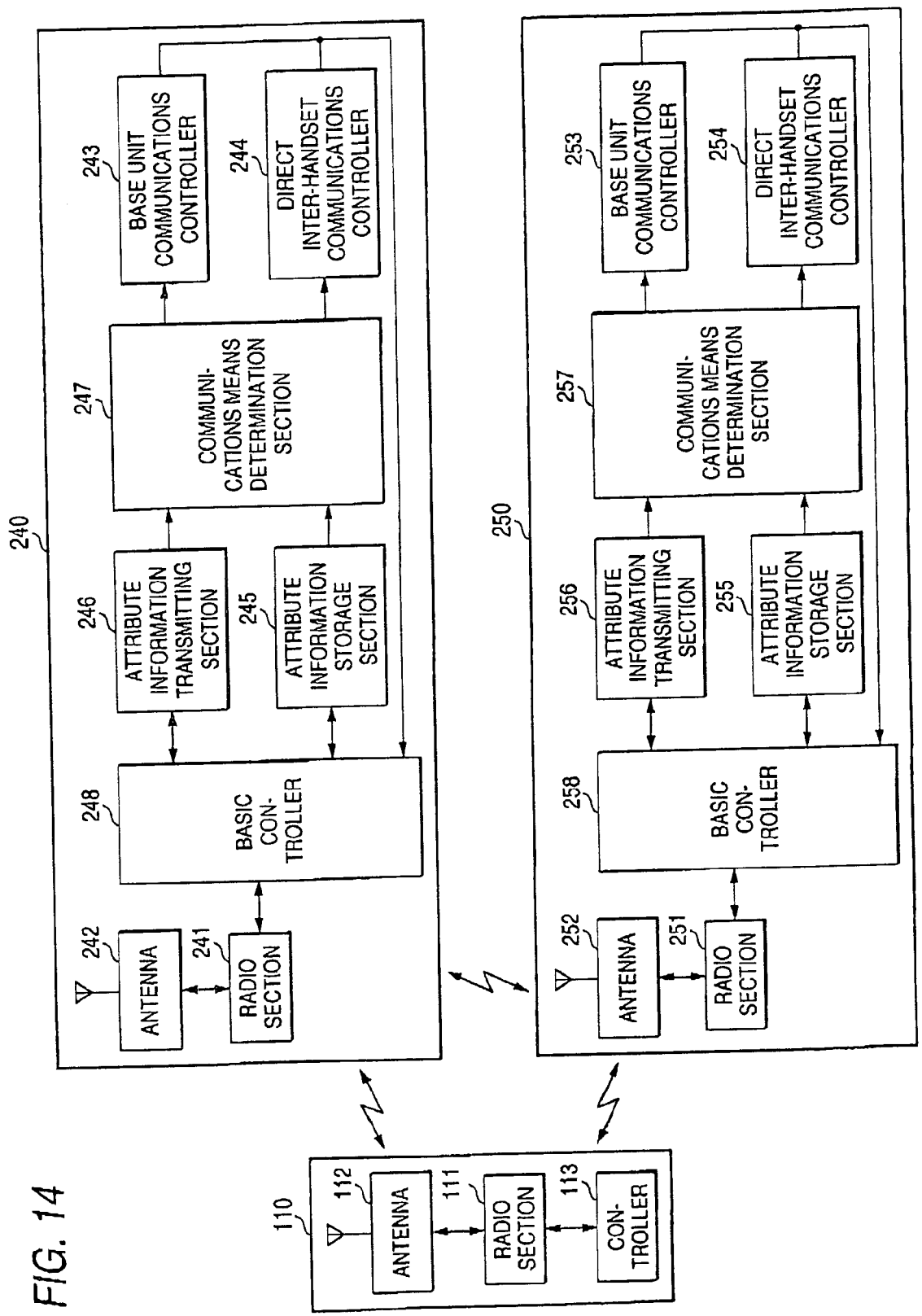
FIG. 14 is a block diagram showing digital radio communications apparatus according to Embodiment 6 of the invention.

FIG. 14 is a block diagram showing digital radio communications apparatus according to Embodiment 6 of the invention.

In FIG. 14, a numeral 110 designates a base unit, 111 a radio section for performing radio communications with handsets 240, 250 mentioned later, 112 an antenna, and 113 a controller for controlling the components of the base unit 110 as well as transmitting attribute information received from one handset to another handset while engaged in inter-handset communications via the base unit 110. The components 111 through 113 constitute the base unit 110 of the digital radio communications apparatus. A numeral 240 designates a handset, 241 a radio section for communicating with the base unit 110 or another handset 250, 242 an antenna, 243 a base unit communications controller, 244 a direct inter-handset communications controller, 245 an attribute information storage section for storing a communications type provided by a local handset, 246 an attribute information transmitting section for communicating to a distant handset the communications type provided by the local handset and receiving the communications type provided by the distant handset, 247 a communications means determination section for determining whether to maintain communications via the base unit 110 or activate direct inter-handset communications based on the attribute information of the local handset and the attribute information of the distant handset, and 248 a basic controller for controlling the components of the handset as well as making control to transmit the attribute information of the local handset when transmitting a call request for an incoming call response. The components 241 through 248 constitute the handset 240 of the digital radio communications apparatus. A numeral 250 designates a handset, 251 a radio section for communicating with the base unit 110 or another handset 240, 252 an antenna, 253 a base unit communications controller, 254 a direct inter-handset communications controller, 255 an attribute information storage section for storing a communications type provided by a local handset, 256 an attribute information transmitting section for communicating to a distant handset the communications type provided by the local handset and receiving the communications type provided by the distant handset, 257 a communications means determination section for determining whether to maintain communications via the base unit 110 or activate direct inter-handset communications based on the attribute information of the local handset and the attribute information of the distant handset, and 248 a basic controller for controlling the components of the handset as well as making control to transmit the attribute information of the local handset when transmitting a call request for an incoming call response. The components 251 through 258 constitute the handset 250 of the digital radio communications apparatus.

Figure 15:
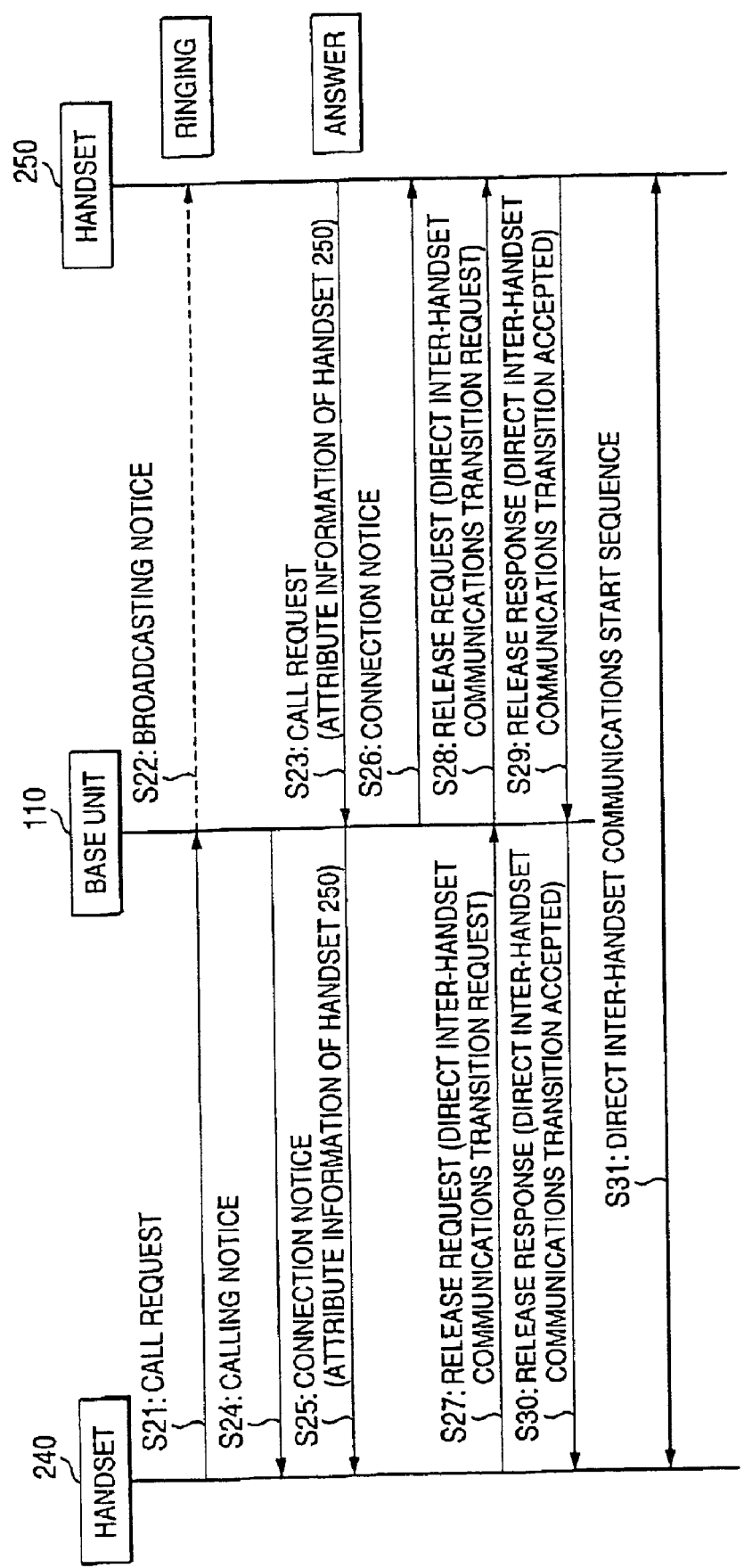
FIG. 15 is a sequence diagram showing an operation of the digital radio communications apparatus of FIG. 14.

An operation of the digital radio communications apparatus thus configured is described below referring to FIG. 15. FIG. 15 is a sequence diagram showing an operation of the digital radio communications apparatus of FIG. 14.

In FIG. 15, in case the handset 240 calls all the handsets or some of the handsets as a distant party, the handset 240 transmits a Call Request message to the base unit 110 containing the information on the specification of all the handsets or some of the handsets as an object of calling (S21). Receiving the a Call Request message, the base unit 100 broadcasts an incoming call based on a related art technology (S22). In case the handset 250 is an object of broadcasting, the handset 250 which has received the broadcasting receives an incoming call. In case the user of the handset 250 has answered the incoming call, the basic controller 258 of the handset 250 fetches a communications type supported by a local handset from the attribute information storage section 255 and transmits a Call Request message containing the communications type as information element to the base unit 110 (S23). Meanwhile, the base unit 110 makes a calling notice to the handset 240 (S24). Receiving the Call Request message via the antenna 112 and the radio section 111, the controller 113 of the base unit 110 transmits to the handset 240 a Connection Notice message containing the information element in the Call Request message to notify that the incoming call is answered (S25). The controller 113 of the base unit 110 also transmits to the handset 250 a Connection Notice message in response to the Call Request message (S26). Receiving the Connection Notice message, the basic controller 258 of the handset 250 transmits the Connection Notice message to the attribute information transmitting section 256. Receiving the Connection Notice message, the attribute information transmitting section 256 fetches the attribute information of the handset 240 from the Connection Notice message and transmits the attribute information to the communications means determination section 257. The communications means determination section 257 fetches the attribute information of the local handset from the attribute information storage section 255 which stores the attribute information of the local handset, compares the attribute information with the attribute information of the handset 240, and determines an available communications type. In case the communications means determination section 257 has determined that direct inter-handset communications are appropriate, it activates the direct inter-handset communications controller 254 and transmits a Direct Inter-handset Communications Transition Request message, same as Embodiment 5 (S6). The communications means determination section 257 subsequently performs the same processing as the related art (S105 through S109) to establish direct inter-handset communications between the handset 240 and the handset 250 (S110 through S116).

The following procedure can also be used to establish direct inter-handset communications:

Instead of the Direct Inter-handset Communications Transition Request message, a Release Request message containing an information element to indicate the Direct Inter-handset Communications Transition Request message is transmitted from the handset 240 to the base unit 110 (S27). Receiving the Release Request message, the controller 113 of the base unit 110 transmits to the handset 250 the Release Request message containing the information element transmitted from the handset 240 (S28). Receiving the Release Request message, the basic controller 258 of the handset 250 transmits to the base unit 110 a Release Response message containing an information element to indicate acceptance of a transition to direct inter-handset communications in response to the information element to indicate a Direct Inter-handset Communications Transition Request contained in the Release Request message (S29). Receiving the Release Response message, the controller 113 of the base unit 110 transmits the Release Response message to the handset 240 including the information element transmitted from the handset 250 (S30). Receiving the Release Response message, the basic controller 248 of the handset 240 releases the radio connection with the base unit 110 based on the Release Response message as well as checks the information element to indicate acceptance of a transition to direct inter-handset communications in the Release Response message and activates establishment of direct inter-handset communications (S31).

As mentioned hereinabove, according to this embodiment, the handset 240 comprises: a radio section 241 for performing radio communications; a base unit communications controller 243 for performing radio communications with the base unit 110; a direct inter-handset communications controller 244 for performing direct radio communications between handsets; an attribute information storage section 245 for storing a communications type provided by a local handset; an attribute information transmitting section 246 for communicating the communications type provided by a local handset to a distant handset 250 as well as receiving a communications type provided by the distant handset 250; a communications means determination section 247 for determining whether to maintain communications via the base unit 100 or activate direct inter-handset communications based on the attribute information of the local handset 240 and the attribute information of the distant handset 250; and a basic controller 248 for controlling the components of the handset as well as making control to transmit the attribute information of the local handset 240 when transmitting a call request for an incoming call response. The base unit 110 comprises: a radio section 111 for performing radio communications with handsets; and a controller 113 for controlling the components of the base unit 110 as well as transmitting attribute information received from one handset during inter-handset communications via the base unit to another handset; characterized in that the communications means determination section 247 activates an available communications type based on the attribute information of the handset transmitted from the controller 113. As a result, the attribute information received from one handset during inter-handset communications via the base unit 110 is transmitted to another handset. It is thus possible to determine, based on the communications type information contained in the attribute information, whether to make a transition to direct inter-handset communications or maintain inter-handset communications via the base unit 110, by way of a function specific to the handsets 240, 250, without using a special function of the base unit 110. The communications means determination section 247 can activate an available communications type based on the attribute information of the handset which has answered an incoming call. In case a plurality of communications types are available, it is also possible to select and provide an optimum communications type.

Embodiment 7

Figure 16:
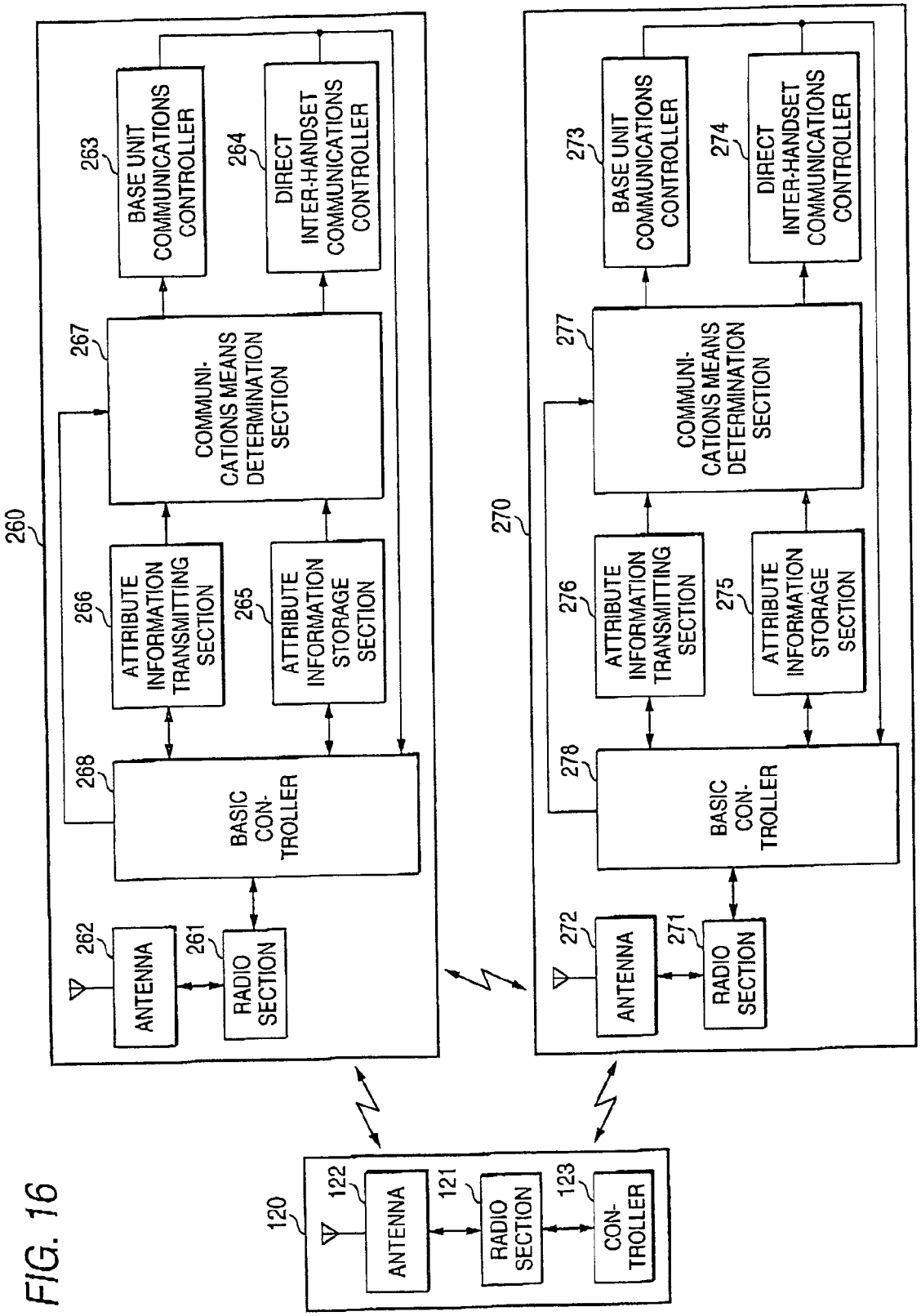
FIG. 16 is a block diagram showing digital radio communications apparatus according to Embodiment 7 of the invention.

FIG. 16 is a block diagram showing digital radio communications apparatus according to Embodiment 7 of the invention.

In FIG. 16, a numeral 120 designates a base unit, 121 a radio section for performing radio communications with handsets 260, 270 mentioned later, 122 an antenna, and 123 a controller for controlling the components of the base unit 120 as well as transmitting in the content of broadcasting the attribute information contained in a Call Request from a handset. The components 121 through 123 constitute the base unit 120 of the digital radio communications apparatus. A numeral 260 designates a handset, 261 a radio section for communicating with the base unit 120 or another handset 270, 262 an antenna, 263 a base unit communications controller, 264 a direct inter-handset communications controller, 265 an attribute information storage section for storing a communications type provided by a local handset, 266 an attribute information transmitting section for communicating to a distant handset the communications type provided by the local handset and receiving the communications type provided by the distant handset, 267 a communications means determination section for determining whether to maintain communications via the base unit 120 or activate direct inter-handset communications based on the attribute information of the local handset and the attribute information of the distant handset, and 268 a basic controller for controlling the components of the handset as well as making control to transmit a Call Request Message containing the communications type specified at call origination. The components 261 through 268 constitute the handset 260 of the digital radio communications apparatus. A numeral 270 designates a handset, 271 a radio section for communicating with the base unit 120 or another handset 260, 272 an antenna, 273 a base unit communications controller, 274 a direct inter-handset communications controller, 275 an attribute information storage section for storing a communications type provided by a local handset, 276 an attribute information transmitting section for communicating to a distant handset the communications type provided by the local handset and receiving the communications type provided by the distant handset, 277 a communications means determination section for determining whether to maintain communications via the base unit 120 or activate direct inter-handset communications based on the attribute information of the local handset and the attribute information of the distant handset, and 278 a basic controller for controlling the components of the handset as well as making control to transmit a Call Request Message containing the communications type specified at call origination. The components 271 through 278 constitute the handset 270 of the digital radio communications apparatus.

Figure 17:
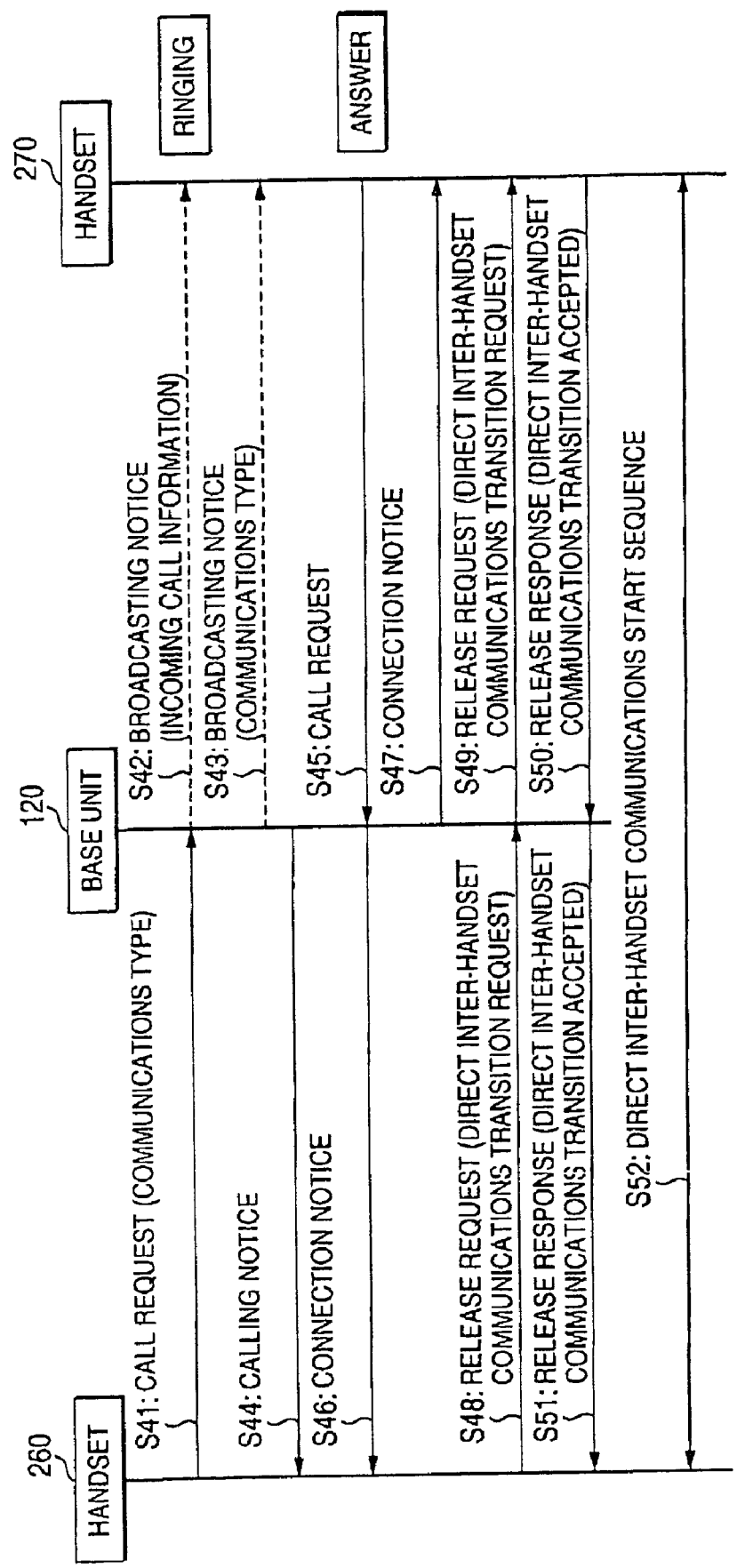
FIG. 17 is a sequence diagram showing an operation of the digital radio communications apparatus of FIG. 16.

An operation of the digital radio communications apparatus thus configured is described below referring to FIGS. 17 and 18. FIG. 17 is a sequence diagram showing an operation of the digital radio communications apparatus of FIG. 16. FIG. 18 is a data diagram showing communications type information.

In FIG. 17, in case the handset 260 calls handsets with a communications type specified from the calling handset 260, the basic controller 268 of the handset 260 fetches the attribute information of the local handset from the attribute information storage section 265 and determines an appropriate communications type based on the attribute information, then transmits a Call Request message containing the communications type as an information element to the base unit 120 (S41). An example of the communications type information element is shown in FIG. 18. Receiving the Call Request message via the antenna 122 and the radio section 121, the controller 123 of the base unit 120 transmits a broadcasting notice to notify an incoming call as well as the communications type specified by the handset 260 as a broadcasting notice (S42, S43). After the broadcasting notice, the controller 123 makes a call notice to the handset 260 (S44). Receiving both broadcasting notices, the basic controller 278 of the handset 270 checks that the local handset is an object of call termination and fetches the communications type specified by the handset 260 from the broadcasting notice. The basic controller 278 of the handset 270 also fetches the attribute information of the local handset and compares the attribute information with the communications type. The basic controller 278 determines that an incoming call may terminate at the local handset in case the attribute information of the local handset matches the communications type and lets the incoming call terminate. In case the user of the handset 270 has answered the incoming call, the basic controller 278 of the handset 270 transmits a Call Request message to the base unit 120 (S45). Receiving the Call Request message, the controller 123 of the base unit 120 transmits a Connection Notice message to the handset 260 to notify that the incoming call is answered (S46). The Connection Notice message is transmitted to the handset 270 also (S47). Receiving the Connection Notice message, the basic controller 268 of the handset 260 determines that the incoming call has been answered by a handset conforming to the specified communications type and transmits a communications activation request containing the communications type to the communications means determination section 267. Receiving the communications activation request, the communications means determination section 267 activates communications in accordance with the specified communications type. In case direct inter-handset communications are designated in the specified communications type, the communications means determination section 267 performs the same processing as that of Embodiment 2 (S48 through S51) to activate direct inter-handset communications (S52).

FIG. 19 is a sequence diagram showing an operation of the digital radio communications apparatus of FIG. 16. In this embodiment, the sequence shown in FIG. 19 may be used to release communications via the base unit 120 from the called handset 270 and activate direct inter-handset communications. The steps S61 through S66 correspond to the steps S41 through S46 in FIG. 7 so that the corresponding description is omitted. In case base unit is designated in the specified communications type, the basic controller 278 of the handset 270 receives a connection notice (S67) and transmits to the base unit 120 a Release Request message containing the information element indicating a direct inter-handset communications transition request (S68). Receiving the Release Request message, the controller 123 of the base unit 120 transmits to the handset 260 the Release Request message containing the information element transmitted from the handset 270 (S69). Receiving the Release Request message, the basic controller 268 of the handset 260 transmits to the base unit 120 a Release Response message containing an information element to indicate acceptance to a transition to direct inter-handset communications in response to the information element to indicate a direct inter-handset communications transition request contained in the Release Request message (S70). Receiving the Release Request message, the controller 123 of the base unit 120 transmits to the handset 270 the Release Response message containing the information element transmitted from the handset 260 (S71). Receiving the Release Response message, the basic controller 278 of the handset 270 releases the radio connection with the base unit 120 based on the Release Response message as well as checks the information element to indicate acceptance of a transition to direct inter-handset communications contained in the Release Response message and activates a direct inter-handset communications controller 274 to start transmitting control channel data via the radio section 271 and the antenna 272 (S72). Meanwhile, the controller 265 of the handset 260, releasing communications with the base unit 120, activates a direct inter-handset communications controller 264 to start control channel scan by using the antenna 262 and the radio section 261. Receiving control channel data from the handset 270, the controller 265 checks the identifier and transmits a communications channel establishment request to the handset 270 (S73) to establish a communications channel (S74) The handset 270 then transmits a Call Request message to the handset 260 (S75). Receiving the Call Request message, the handset 260 transmits a Call Accepted message to the handset 270 (S76). In this example, a transition is made from communications via the base unit 120 to direct inter-handset communications, so that an Incoming Call Response message is automatically transmitted from the direct inter-handset communications controller 264 to the handset 270 (S77) to start direct inter-handset communications (S78).

As mentioned hereinabove, according to this embodiment, the handset 260 comprises: a radio section 261 for performing radio communications; abase unit communications controller 263 for performing radio communications with the base unit 120; a direct inter-handset communications controller 264 for performing direct radio communications between handsets; an attribute information storage section 265 for storing a communications type provided by a local handset 260; an attribute information transmitting section 266 for communicating the communications type provided by the local handset 260 to a distant handset 270 as well as receiving a communications type provided by the distant handset 270; a communications means determination section 267 for determining whether to maintain communications via the base unit 120 or activate direct inter-handset communications based on the attribute information of the local handset 260 and the attribute information of the distant handset 270; and a basic controller 268 for controlling the components of the handset as well as making control to transmit a Call Request message containing the communications type specified at call origination. The base unit 120 comprises: a radio section 121 for performing radio communications with handsets; and a controller 123 for controlling the components of the base unit 120 as well as transmitting in the content of broadcasting the communications type contained in the call request from a handset; characterized in that the communications means determination section 267 activates communications according to the communications type transmitted in the broad casting notice. As a result, the base unit 120 transmits in the content of broadcasting the communications type contained in the call request from a handset so that the calling handset 260 will communicate the communications type to all the distant headsets 270. It is thus possible to determine whether to make a transition to direct inter-handset communications or maintain inter-handset communications via the base unit 120, by way of a function specific to the handsets 260, 270, without using a special function of the base unit 120. It is possible to select a distant handset conforming to the communications type requested by the calling handset 260. In case a plurality of communications types are available to communicate with the distant party, it is also possible to select and provide an optimum communications type.

The communications means determination section 277, in case the local handset is a called handset 270, releases inter-handset communications via the base unit 120 as well as activates direct inter-handset communications. Thus, the base unit 120 transmits in the content of broadcasting the communications type contained in the call request from the handset 260 so that the calling handset 260 will communicate the communications type to all the distant headsets. Further, base unit is activated when the called handset 270 releases inter-handset communications via the 120. It is thus possible to determine whether to make a transition to direct inter-handset communications or maintain inter-handset communications via the base unit 120, by way of a function specific to the handsets 260, 270, without using a special function of the base unit 120. It is possible to activate direct inter-handset communications from the called handset 270. In case a plurality of communications types are available to communicate with the distant party, it is also possible to select and provide an optimum communications type.

Embodiment 8

Figure 20:
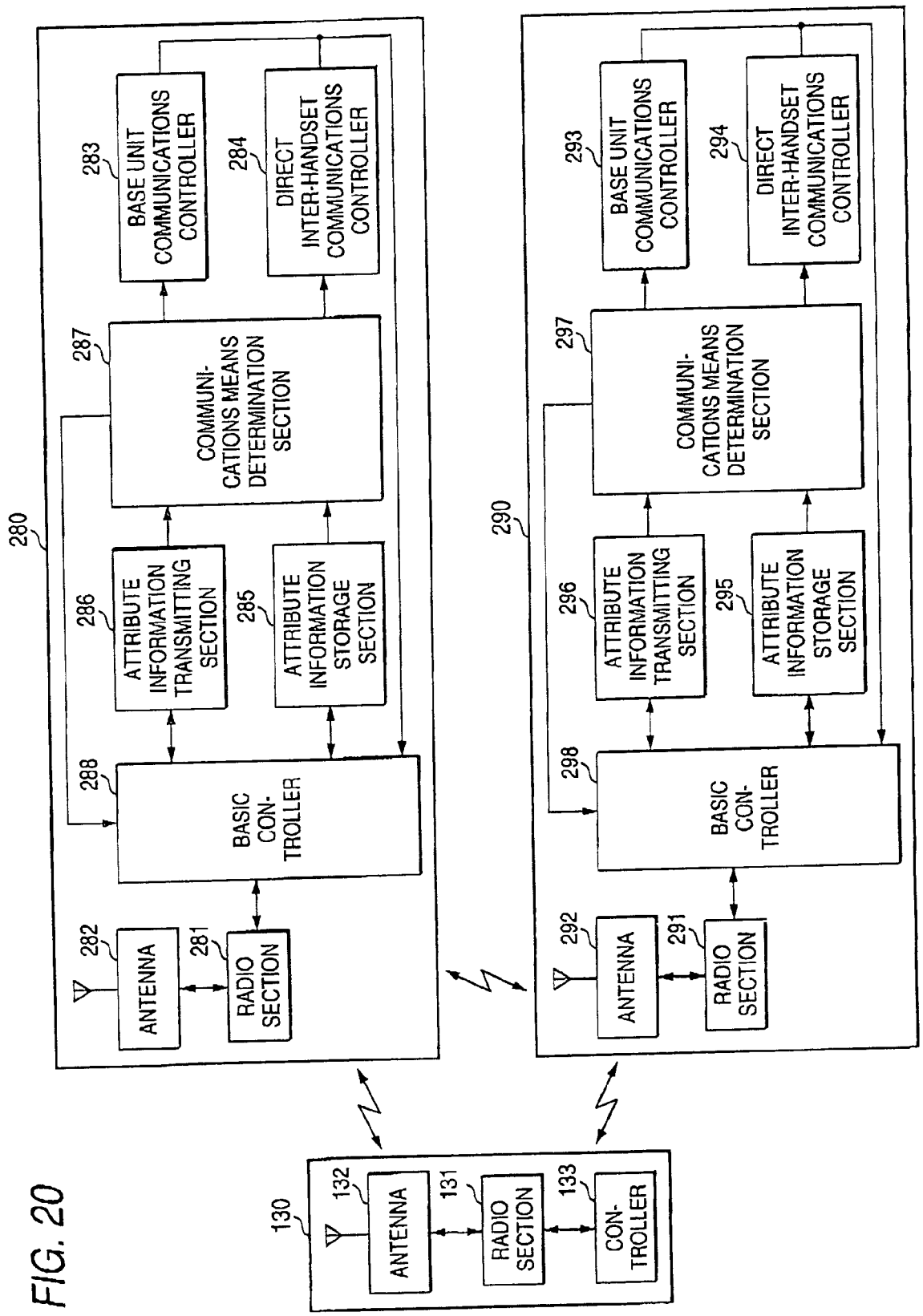
FIG. 20 is a block diagram showing digital radio communications apparatus according to Embodiment 8 of the invention.

FIG. 20 is a block diagram showing digital radio communications apparatus according to Embodiment 8 of the invention.

In FIG. 20, a numeral 130 designates a base unit, 131 a radio section for performing radio communications with handsets 280, 290 mentioned later, 132 an antenna, and 133 a controller for controlling the components of the base unit 120 as well as transmitting in the content of broadcasting the attribute information contained in a Call Request from a handset. The components 131 through 133 constitute the base unit 130 of the digital radio communications apparatus. A numeral 280 designates a handset, 281 a radio section for communicating with the base unit 130 or another handset 290, 282 an antenna, 283 a base unit communications controller, 284 a direct inter-handset communications controller, 285 an attribute information storage section for storing a communications type provided by a local handset, 286 an attribute information transmitting section for communicating to a distant handset the communications type provided by the local handset and receiving the communications type provided by the distant handset, 287 a communications means determination section for performing the same operation as that of Embodiment 1 as well as determining whether an incoming call may terminate, and 288 a basic controller for controlling the components of the handset as well as making control to transmit the attribute information of the local handset at transmission of a call request from the calling party. The components 281 through 288 constitute the handset 280 of the digital radio communications apparatus. A numeral 290 designates a handset, 291 a radio section for communicating with the base unit 130 or another handset 280, 292 an antenna, 293 a base unit communications controller, 294 a direct inter-handset communications controller, 295 an attribute information storage section for storing a communications type provided by a local handset, 296 an attribute information transmitting section for communicating to a distant handset the communications type provided by the local handset and receiving the communications type provided by the distant handset, 297 a communications means determination section for performing the same operation as that of Embodiment 1 as well as determining whether an incoming call may terminate, and 298 a basic controller for controlling the components of the handset as well as making control to transmit the attribute information of the local handset at transmission of a call request from the calling party. The components 291 through 298 constitute the handset 290 of the digital radio communications apparatus.

Figure 21:
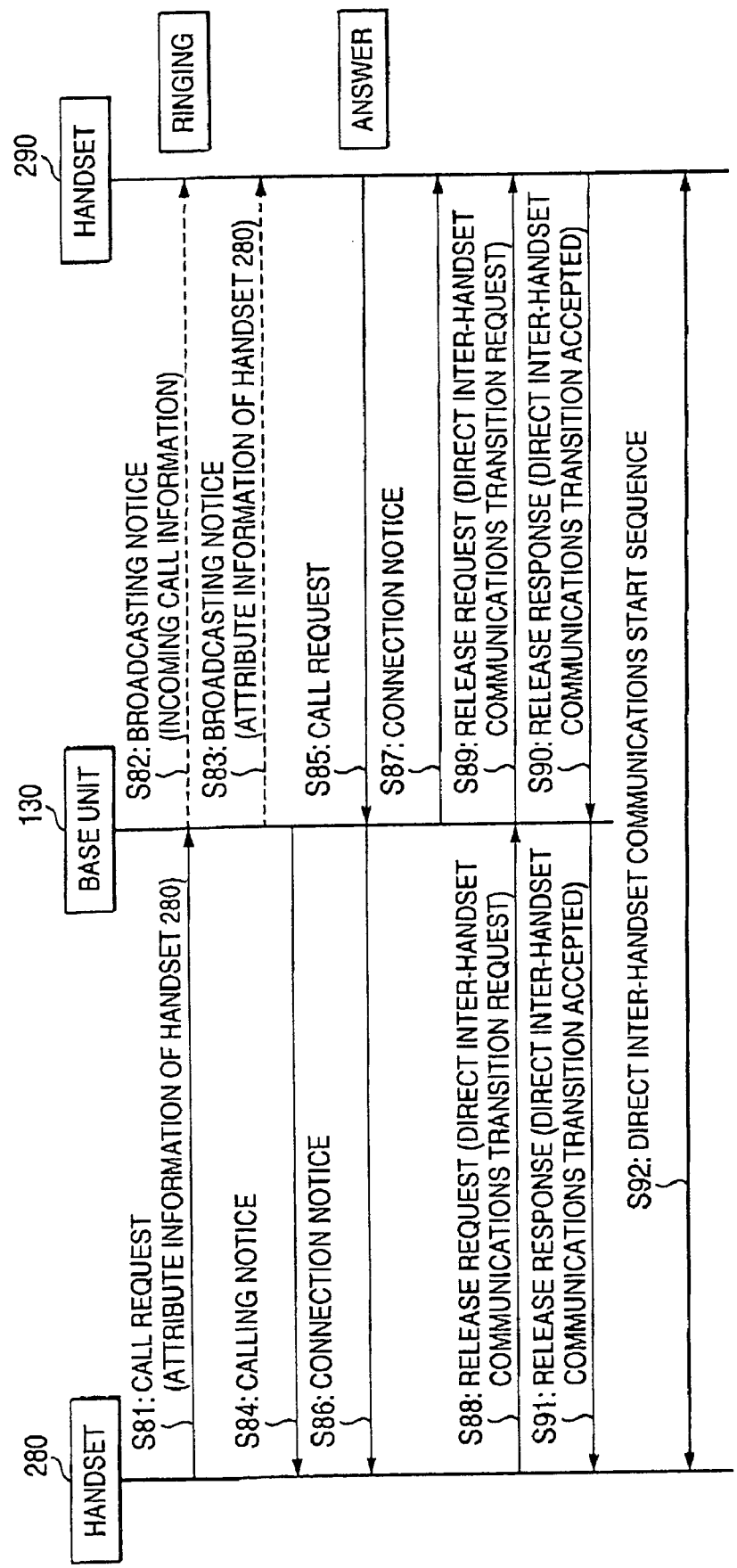
FIG. 21 is a sequence diagram showing an operation of the digital radio communications apparatus of FIG. 20.
Figure 22:
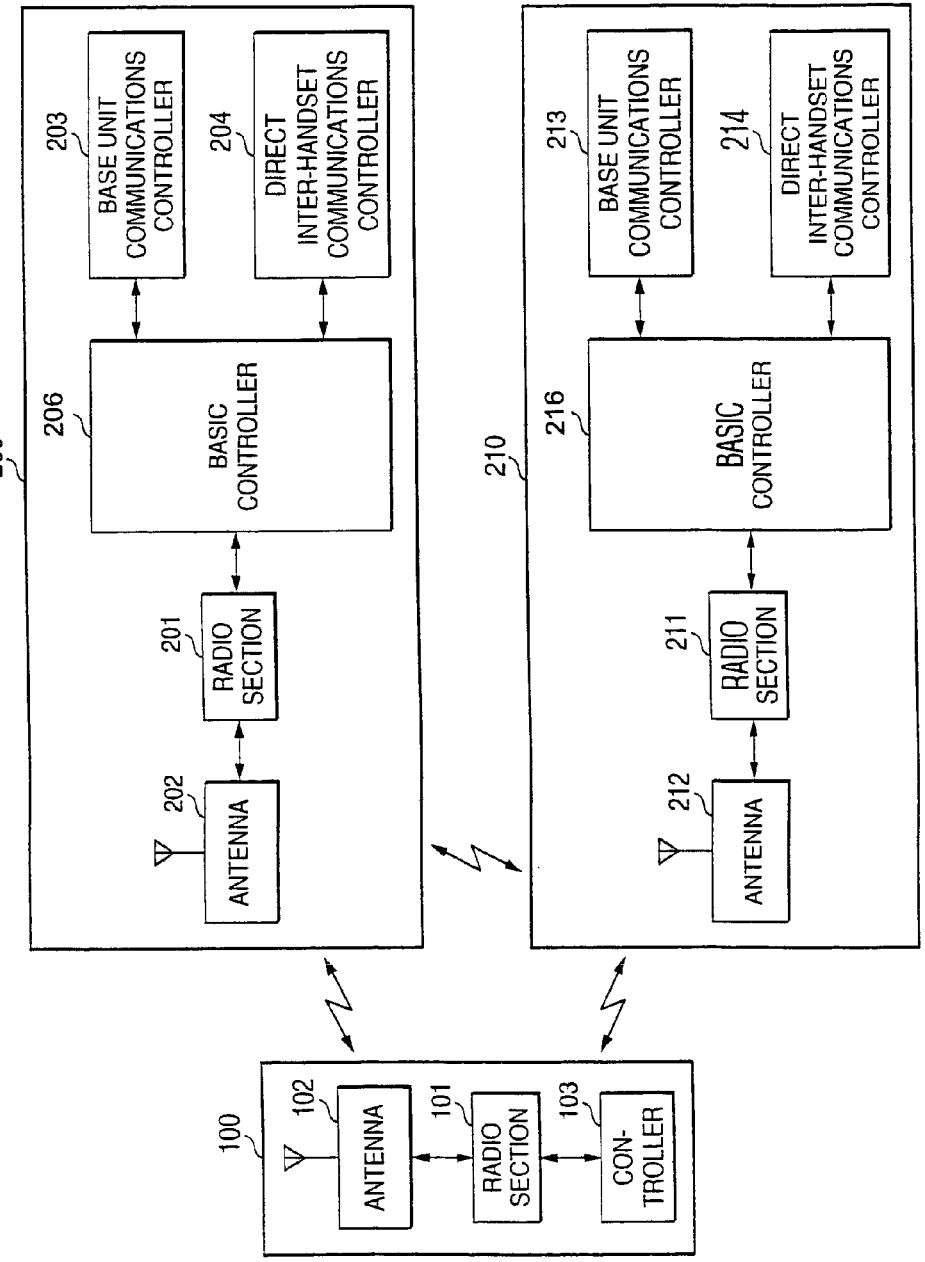
FIG. 22 is a block diagram showing related art radio telephone apparatus as related art digital radio communications apparatus.

An operation of the digital radio communications apparatus thus configured is described below referring to FIG. 21. FIG. 21 is a sequence diagram showing an operation of the digital radio communications apparatus of FIG. 20.

In FIG. 21, in case a handset conforming to the attribute information of the calling handset 280 is to be called, the basic controller 288 of the handset 280 fetches the attribute information of the local handset from the attribute information storage section 285 and transmits a Call Request message containing the communications type as an information element to the base unit 130 (S81). Receiving the Call Request message via the antenna 132 and the radio section 131, the controller 133 of the base unit 130 transmits a broadcasting notice to notify an incoming call as well as the attribute information of the handset 280 as a broadcasting notice (S82, S83). Receiving both broadcasting notices, the basic controller 298 of the handset 290 checks that the local handset is an object of call termination and transmits a broadcasting notice containing the attribute information of the handset 280 to the attribute information transmitting section 296. The attribute information transmitting section 296 fetches the attribute information of the handset 280 from the broadcasting notice and transmits the attribute information to the communications means determination section 297. Receiving the attribute information, the communications means determination section 297 fetches the attribute information of the local handset from the attribute information storage section 295 and compares the attribute information with the attribute information of the handset 280. The basic controller 278 determines that an incoming call may terminate at the local handset in case the attribute information of the local handset matches the attribute information of the handset 280 and transmits an incoming call request to the basic controller. Receiving the incoming call request, the basic controller starts call termination. The basic controller subsequently performs the same operation as that of Embodiment 2. The steps S84, S85, and S86 through S92 in FIG. 21 correspond to the steps S24, S23, and S25 through S31 in FIG. 5.

As mentioned hereinabove, according to this embodiment, the handset 280 comprises: a radio section 281 for performing radio communications; a base unit communications controller 283 for performing radio communications with the base unit 130; a direct inter-handset communications controller 284 for performing direct radio communications between handsets; an attribute information storage section 285 for storing a communications type provided by a local handset; an attribute information transmitting section 286 for communicating the communications type provided by the local handset to a distant handset 290 as well as receiving a communications type provided by the distant handset; a communications means determination section 287 for determining whether to maintain communications via the base unit 130 or activate direct inter-handset communications based on the attribute information of the local handset and the attribute information of the distant handset 290; and a basic controller 288 for controlling the components of the handset as well as making control to transmit the attribute information of the local handset at transmission of a call request from the calling party. The base unit 130 comprises: a radio section 131 for performing radio communications with handsets; and a controller 123 for controlling the components of the base unit 130 as well as transmitting in the content of broadcasting the attribute information contained in the call request from a handset; characterized in that the communications means determination section 297 activates communications according to the communications type in the attribute information transmitted in the broadcasting notice. As a result, the base unit 130 transmits in the content of broadcasting the communications type contained in the call request from the handset 280 so that the calling handset 280 will communicate the communications type to all the distant headsets. The communications means determination section 297 activates communications according to the communications type in the attribute information transmitted in the broadcasting notice. It is thus possible to determine whether to make a transition to direct inter-handset communications or maintain inter-handset communications via the base unit 130, by way of a function specific to the handsets 280, 290, without using a special function of the base unit 130. It is possible to select a communications type in accordance with the attribute information of the calling handset 280. In case a plurality of communications types are available to communicate with the distant party, it is also possible to select and provide an optimum communications type.

While Embodiments 1 through 8 of the invention have been described, the configurations and operations of these embodiments maybe implemented in combination with those of other embodiments.

CROSS REFERENCE TO RELATED APPLICATION

This application is based upon and claims the benefit of priority of Japanese Patent Application No. 2002-313894 filed on Oct. 29, 2002 and Japanese Patent Application No. 2002-328042 filed on Nov. 12, 2002, the contents of which are incorporated herein by reference in its entirety.

What is claimed is:

1. Digital radio communications apparatus comprising: a base unit; a local handset communicable with said base unit; and a distant handset communicable with said base unit,
    wherein said local handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with a base unit as well as transmitting control channels for direct inter-handset communications in vacant slots in the receiving time zones for communications with said base unit; and a basic controller for controlling the components of the local handset; and said
    distant handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with said base unit as well as scanning control channels for direct inter-handset communications in the time zones other than the slots occupied by communications with said base unit; and a basic controller for controlling the components of the distant handset.

2. The digital radio communications apparatus according to claim 1, wherein said direct inter-handset communications transition controller makes control to establish direct inter-handset communications while maintaining communications with said base unit and scans control channels for direct inter-handset communications in the time zones other than the slots occupied by communications with said base unit as well as determines whether to release or maintain communications with said base unit depending on the success or failure of establishment of direct inter-handset communications.

3. Digital radio communications apparatus comprising: a base unit; and a handset communicable with said base unit, wherein said handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with said base unit as well as determines whether to release or maintain communications with said base unit depending on the success or failure of establishment of direct inter-handset communications; and a basic controller for controlling the components of the handset, and said direct inter-handset communications transition controller releases radio communications with said base unit in case direct inter-handset communications has been successfully established and maintains communications via said base unit in case direct inter-handset communications cannot be established.

4. The digital radio communications apparatus according to claim 3, wherein said direct inter-handset communications transition controller makes control to establish direct inter-handset communications while maintaining communications with said base unit as well as transmits control channels for direct inter-handset communications in vacant slots in the receiving time zones for communications with said base unit.

5. Digital radio communications apparatus comprising: a base unit; a local handset communicable with said base unit; and a distant handset communicable with said base unit,
    wherein said base unit comprises: a radio section for performing radio communications; and a controller for controlling the components as well as communicating to the local handset the channels used by the distant handset as channels used by said distant handset and said base unit communicated from said distant handset, and
    said local handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with said base unit, determining whether to release or maintain communications with said base unit depending on the success or failure of establishment of direct inter-handset communications, requesting said base unit to communicate the channels used by said distant handset, and checking whether the channels transmitted from said distant handset to said base unit can be received in the channels used by said distant handset at a transition to direct inter-handset communications; and a basic controller for controlling the components of the local handset.

6. Digital radio communications apparatus comprising: a base unit; a local handset communicable with said base unit; and a distant handset communicable with said base unit,
    wherein said base unit comprises: a radio section for performing radio communications; and a controller for controlling the components as well as communicating to the local handset the channels used by the distant handset as channels used by said distant handset and said base unit communicated from said distant handset, and
    said local handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with said base unit, determining whether to release or maintain communications with said base unit depending on the success or failure of establishment of direct inter-handset communications, and communicating the channels used by said local handset requested; and a basic controller for controlling the components of the local handset, and said distant handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with said base unit, determining whether to release or maintain communications with said base unit depending on the success or failure of establishment of direct inter-handset communications, and checking whether the channels transmitted from the distant handset to the base unit can be received at a transition to direct inter-handset communications; and a basic controller for controlling the components of the distant handset.

7. Digital radio communications apparatus comprising: a base unit and handsets communicable with said base unit, wherein said handset comprises: a radio section for performing radio communications; a base unit communications controller for performing radio communications with said base unit; a direct inter-handset communications controller for performing direct radio communications between handsets; a direct inter-handset communications transition controller for making control to establish direct inter-handset communications while maintaining communications with said base unit, determining whether to release or maintain communications with said base unit depending on the success or failure of establishment of direct inter-handset communications, requesting said base unit to communicate the channels used by a distant handset and said base unit, and checking whether the channels transmitted from the distant handset to said base unit can be received in said requested channels used; and a basic controller for controlling the components of the handset, said base unit comprises: a radio section for performing radio communications; and a controller for controlling the components of said base unit as well as communicating the channels used for communications with a distant handset in response to an inquiry from said local handset, and said direct inter-handset communications transition controller checks whether the channels transmitted from the distant handset to said base unit can be received at a transition to direct inter-handset communications.

* * * * *